(12) United States Patent
Turney et al.

(10) Patent No.: US 11,662,113 B2
(45) Date of Patent: May 30, 2023

(54) BUILDING COOLING SYSTEMS WITH ENERGY OPTIMIZATION AND MODEL PREDICTIVE CONTROL

(71) Applicant: Johnson Controls Technology Company, Auburn Hills, MI (US)

(72) Inventors: Robert D. Turney, Watertown, WI (US); Liming Yang, Mequon, WI (US); Michael J. Wenzel, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 434 days.

(21) Appl. No.: 16/687,122

(22) Filed: Nov. 18, 2019

(65) Prior Publication Data
US 2021/0148592 A1 May 20, 2021

(51) Int. Cl.
| | | |
|---|---|---|
| F24F 11/46 | (2018.01) | |
| F24F 11/56 | (2018.01) | |
| F24F 11/54 | (2018.01) | |
| F24F 11/64 | (2018.01) | |
| F24F 11/65 | (2018.01) | |

(Continued)

(52) U.S. Cl.
CPC .............. *F24F 11/46* (2018.01); *F24F 11/54* (2018.01); *F24F 11/56* (2018.01); *F24F 11/64* (2018.01); *F24F 11/65* (2018.01); *F24F 11/72* (2018.01); *F24F 11/80* (2018.01); *G05B 19/042* (2013.01); *F24F 2110/10* (2018.01); (Continued)

(58) Field of Classification Search
None
See application file for complete search history.

(56) References Cited

U.S. PATENT DOCUMENTS

| 7,580,775 B2 | 8/2009 | Kulyk et al. |
| 7,894,946 B2 | 2/2011 | Kulyk et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

U.S. Appl. No. 16/223,746, filed Dec. 18, 2018, Elbsat et al.

(Continued)

*Primary Examiner* — Nathan L Laughlin
(74) *Attorney, Agent, or Firm* — Foley & Lardner LLP

(57) ABSTRACT

A building cooling system includes one or more cooling devices operable to affect an indoor air temperature of a building and a system management circuit. The system management circuit is configured to obtain an objective function that includes a power consumption term and a comfort term, perform an optimization of the objective function over a time horizon to determine values of the cooling capacity of the cooling devices where each value of the cooling capacity corresponds to a time step of the time horizon, and control the cooling devices based on the values of the cooling capacity of the cooling devices. The comfort term of the objective function a difference between a prediction of the indoor air temperature of the building and a temperature setpoint for the building, while the power consumption term is a function of the power consumption of the one or more cooling devices.

20 Claims, 11 Drawing Sheets

(51) Int. Cl.
| | | |
|---|---|---|
| *F24F 11/72* | (2018.01) | |
| *G05B 19/042* | (2006.01) | |
| *F24F 11/80* | (2018.01) | |
| *F24F 110/10* | (2018.01) | |
| *F24F 110/12* | (2018.01) | |
| *F24F 140/50* | (2018.01) | |
| *F24F 140/60* | (2018.01) | |

(52) U.S. Cl.
CPC ....... *F24F 2110/12* (2018.01); *F24F 2140/50* (2018.01); *F24F 2140/60* (2018.01); *G05B 2219/2614* (2013.01)

(56) References Cited

U.S. PATENT DOCUMENTS

| | | | |
|---|---|---|---|
| 8,527,108 | B2 | 9/2013 | Kulyk et al. |
| 8,527,109 | B2 | 9/2013 | Kulyk et al. |
| 8,918,223 | B2 | 12/2014 | Kulyk et al. |
| 9,002,532 | B2 | 4/2015 | Asmus |
| 9,110,647 | B2 | 8/2015 | Kulyk et al. |
| 9,436,179 | B1 | 9/2016 | Turney et al. |
| 9,447,985 | B2 | 9/2016 | Johnson |
| 9,696,054 | B2 | 7/2017 | Asmus |
| 9,703,339 | B2 | 7/2017 | Kulyk et al. |
| 9,852,481 | B1 | 12/2017 | Turney et al. |
| 10,007,259 | B2 | 6/2018 | Turney et al. |
| 10,101,731 | B2 | 10/2018 | Asmus et al. |
| 10,139,877 | B2 | 11/2018 | Kulyk et al. |
| 10,146,237 | B2 | 12/2018 | Turney et al. |
| 10,175,681 | B2 | 1/2019 | Wenzel et al. |
| 10,190,789 | B2 | 1/2019 | Mueller et al. |
| 10,282,796 | B2 | 5/2019 | Elbsat et al. |
| 10,386,820 | B2 | 8/2019 | Wenzel et al. |
| 10,452,034 | B2 | 10/2019 | Vitullo et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2015/0134124 | A1* | 5/2015 | Carter ............... F24F 11/30 700/278 |
| 2015/0316907 | A1 | 11/2015 | Elbsat et al. |
| 2016/0313751 | A1 | 10/2016 | Risbeck et al. |
| 2017/0030598 | A1 | 2/2017 | Burns et al. |
| 2018/0004171 | A1 | 1/2018 | Patel et al. |
| 2018/0004172 | A1 | 1/2018 | Patel et al. |
| 2018/0004173 | A1 | 1/2018 | Patel et al. |
| 2018/0075549 | A1 | 3/2018 | Turney et al. |
| 2018/0142914 | A1* | 5/2018 | Seo ................... F24F 11/64 |
| 2018/0285800 | A1 | 10/2018 | Wenzel et al. |
| 2018/0356782 | A1 | 12/2018 | Elbsat et al. |
| 2019/0032944 | A1 | 1/2019 | Wenzel et al. |
| 2019/0033800 | A1 | 1/2019 | Elbsat et al. |
| 2019/0072919 | A1 | 3/2019 | Mueller et al. |
| 2019/0072943 | A1 | 3/2019 | Przybylski |
| 2019/0206000 | A1 | 7/2019 | Elbsat et al. |
| 2019/0213695 | A1 | 7/2019 | Elbsat et al. |
| 2019/0235453 | A1 | 8/2019 | Turney et al. |
| 2019/0271483 | A1* | 9/2019 | Joo .................... F24F 11/62 |
| 2019/0286114 | A1 | 9/2019 | Przybylski et al. |
| 2019/0338973 | A1 | 11/2019 | Turney et al. |
| 2019/0384259 | A1 | 12/2019 | Wenzel et al. |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

U.S. Appl. No. 16/415,170, filed May 17, 2019, Burroughs et al.
U.S. Appl. No. 16/555,591, filed Aug. 29, 2019, Burroughs et al.
U.S. Appl. No. 16/122,399, filed Sep. 5, 2018, Turney et al.
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-lmages.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System-JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-lmages.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-lmages.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

(56) References Cited

OTHER PUBLICATIONS

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation Gui," Url: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_ CIP_As Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

BUILDING COOLING SYSTEMS WITH ENERGY OPTIMIZATION AND MODEL PREDICTIVE CONTROL

BACKGROUND

The present disclosure relates generally to managing energy consumption in variable refrigerant flow (VRF) systems, window air conditioning (WAC) systems, room air conditioning (RAC) systems, or packaged air conditioning (PAC) systems that provide temperature control for a building. Minimizing energy consumption of such systems may lead to discomfort for occupants of the building because comfortable temperatures cannot be maintained without increased power, while precisely matching occupant preferences at all times typically leads to high power consumption. Thus, systems and methods are needed to reduce energy consumption of VRF, WAC, RAC, and PAC systems without leading to occupant discomfort.

SUMMARY

One implementation of the present disclosure is a building cooling system. The building cooling system includes one or more cooling devices operable to affect an indoor air temperature of a building and a system management circuit. The system management circuit is configured to obtain an objective function comprising a power consumption term and a comfort term; perform an optimization of the objective function over a time horizon to determine a plurality of values of the cooling capacity of the one or more cooling devices, each value of the cooling capacity corresponding to a time step of the time horizon; and control the one or more cooling devices based on the plurality of values of the cooling capacity of the one or more cooling devices. The comfort term of the objective function includes a difference between a prediction of the indoor air temperature of the building and a temperature setpoint for the building, where the indoor air temperature prediction is based on an efficiency model that defines cooling capacity of the one or more cooling devices as a function of power consumption of the one or more cooling devices. The power consumption term of the objective function includes a function of the power consumption of the one or more cooling devices.

In some embodiments, the one or more cooling devices include at least one of variable refrigerant flow units, room air conditioning units, packaged air conditioning units, or window air conditioning units.

In some embodiments, the indoor air temperature prediction is based on a dynamic thermal model of the building including the efficiency model.

In some embodiments, the objective function further includes a sum of the power consumption term and the comfort term.

In some embodiments, the objective function further includes a weighting parameter multiplied by the power consumption term or the comfort term.

In some embodiments, the system management circuit is configured to obtain the weighting parameter from a user input.

In some embodiments, controlling the one or more cooling devices based on the plurality of values of the cooling capacity of the one or more cooling devices includes preventing, for each time step of the plurality of time steps, the cooling capacity of the one or more cooling devices from exceeding the value of the cooling capacity for the corresponding time step.

Another implementation of the present disclosure is a method. The method includes operating equipment to affect an indoor air temperature of a building; obtaining an objective function including a power consumption term and a comfort term; determining, for each of a plurality of time steps of a time horizon, a value of the at least one of heating capacity or cooling capacity of the equipment by performing an optimization of the objective function over the time horizon; and controlling, for each of the plurality of time steps of the time horizon, the equipment based on the value of at least one of the heating capacity or the cooling capacity of the equipment. The comfort term of the objective function includes a difference between a prediction of the indoor air temperature of the building and a temperature setpoint for the building, where the prediction of the indoor air temperature is based on an efficiency model that defines at least one of the heating capacity or the cooling capacity of the equipment as a function of power consumption of the equipment. The power consumption term of the objective function includes a function of the power consumption of the equipment.

In some embodiments, the indoor air temperature prediction is based on a dynamic thermal model of the building comprising the efficiency model.

In some embodiments, the objective function includes a sum of the power consumption term and the comfort term.

In some embodiments, controlling the equipment based on the value of at least one of the heating capacity or the cooling capacity of the equipment comprises preventing, for each of the plurality of time steps, at least one of the heating capacity or the cooling capacity of the equipment from exceeding the value for the time step.

In some embodiments, the comfort term or the power consumption term are multiplied by a weighting parameter.

In some embodiments, the system management circuit obtains the weighting parameter from a user input.

Yet another implementation of the present disclosure is a building cooling system. The building cooling system includes one or more cooling devices operable to affect an indoor air temperature of a building and a system management circuit. The system management circuit is configured to obtain an objective function comprising an efficiency term and a comfort term; perform an optimization of the objective function over a time horizon to determine a plurality of values of the cooling capacity of the one or more cooling devices, each value of the cooling capacity corresponding to a time step of the time horizon; and control the one or more cooling devices based on the plurality of values of the cooling capacity of the one or more cooling devices. The comfort term of the objective function includes a difference between a prediction of the indoor air temperature of the building and a temperature setpoint for the building, where the indoor air temperature prediction is based on an efficiency model that defines cooling capacity of the one or more cooling devices as a function of power consumption of the one or more cooling devices. The power consumption term of the objective function includes a function of the power consumption of the one or more cooling devices.

In some embodiments, the one or more cooling devices include at least one of variable refrigerant flow units, room air conditioning units, packaged air conditioning units, or window air conditioning units.

In some embodiments, the prediction of the indoor air temperature is based on a dynamic thermal model of the building including the efficiency function.

In some embodiments, the objective function further includes a difference of the efficiency term and the comfort term.

In some embodiments, the objective function further includes a weighting parameter multiplied by the comfort term.

In some embodiments, the system management circuit is configured to obtain the weighting parameter from a user input.

In some embodiments, controlling the one or more cooling devices based on the plurality of values of the cooling capacity of the one or more cooling devices comprises preventing, for each time step of the plurality of time steps, the cooling capacity of the one or more cooling devices from exceeding the value of the cooling capacity for the corresponding time step.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Variable Refrigerant Flow Systems

Figure 1A:
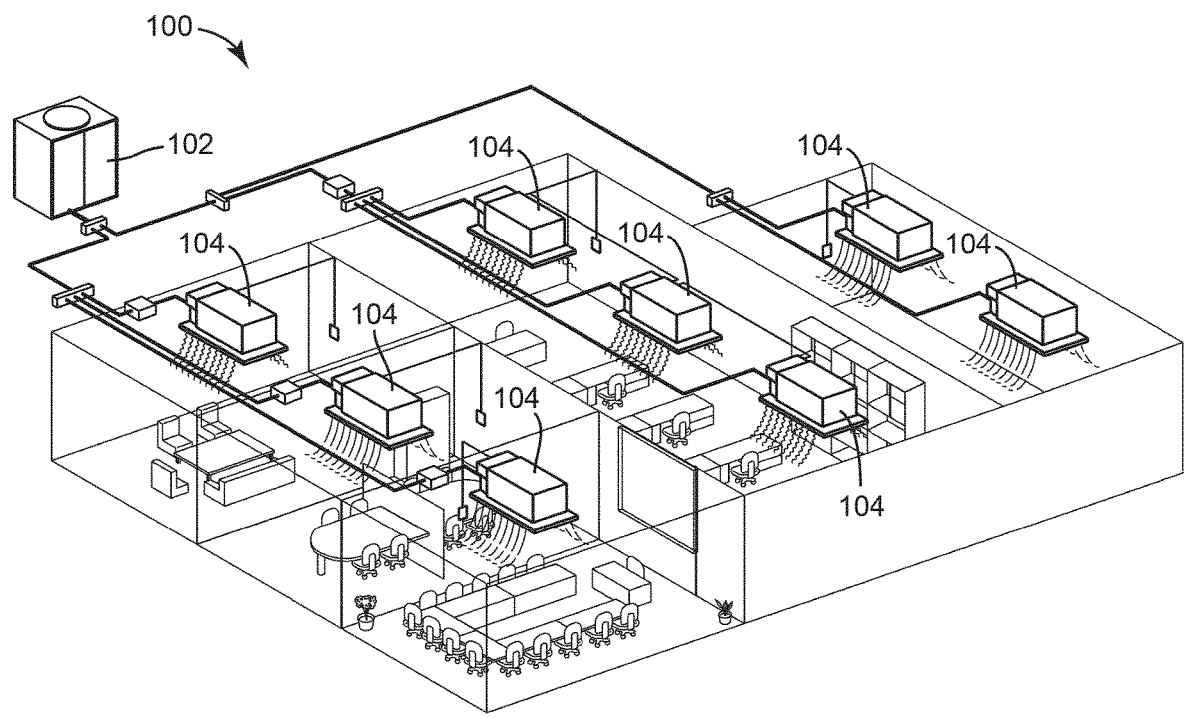
FIG. 1A is a diagram of a building served by a variable refrigerant flow system, according to an exemplary embodiment.
Figure 1B:
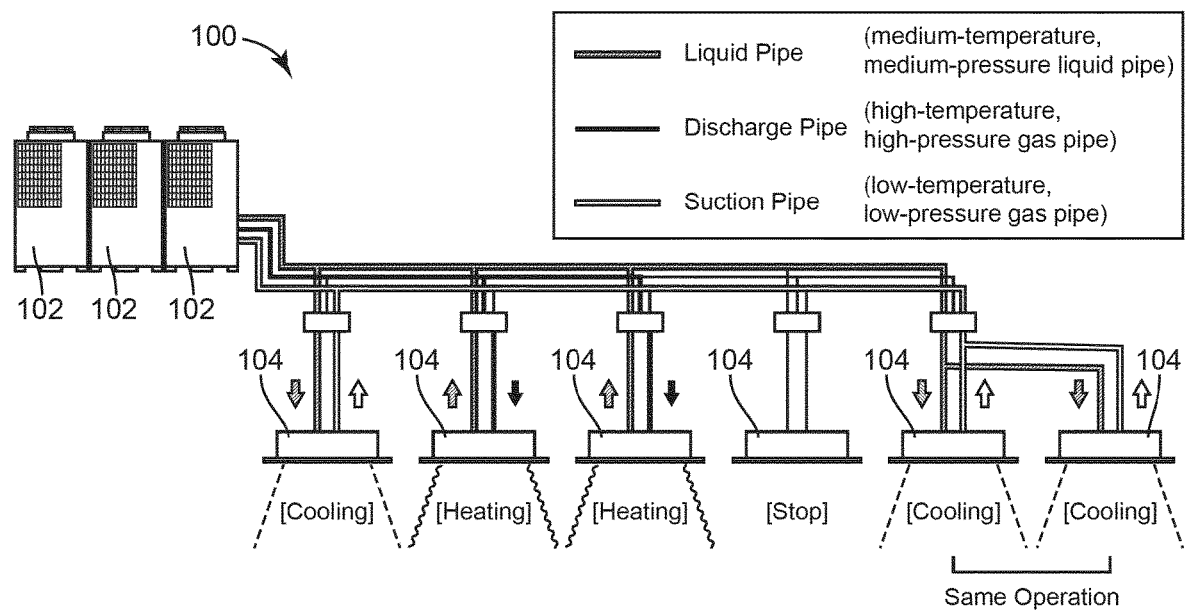
FIG. 1B is a diagram of the variable refrigerant flow system of FIG. 1A, according to an exemplary embodiment.

Referring now to FIGS. 1A-B, a variable refrigerant flow (VRF) system 100 is shown, according to some embodiments. VRF system 100 is shown to include one or more outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit 104 is located. Although the term "indoor" is used to denote that the indoor VRF units 104 are typically located inside of buildings, in some cases one or more indoor VRF units are located "outdoors" (i.e., outside of a building) for example to heat/cool a patio, entryway, walkway, etc.

One advantage of VRF system 100 is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 100.

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of outdoor VRF units 102 may operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 2.

Figure 2:
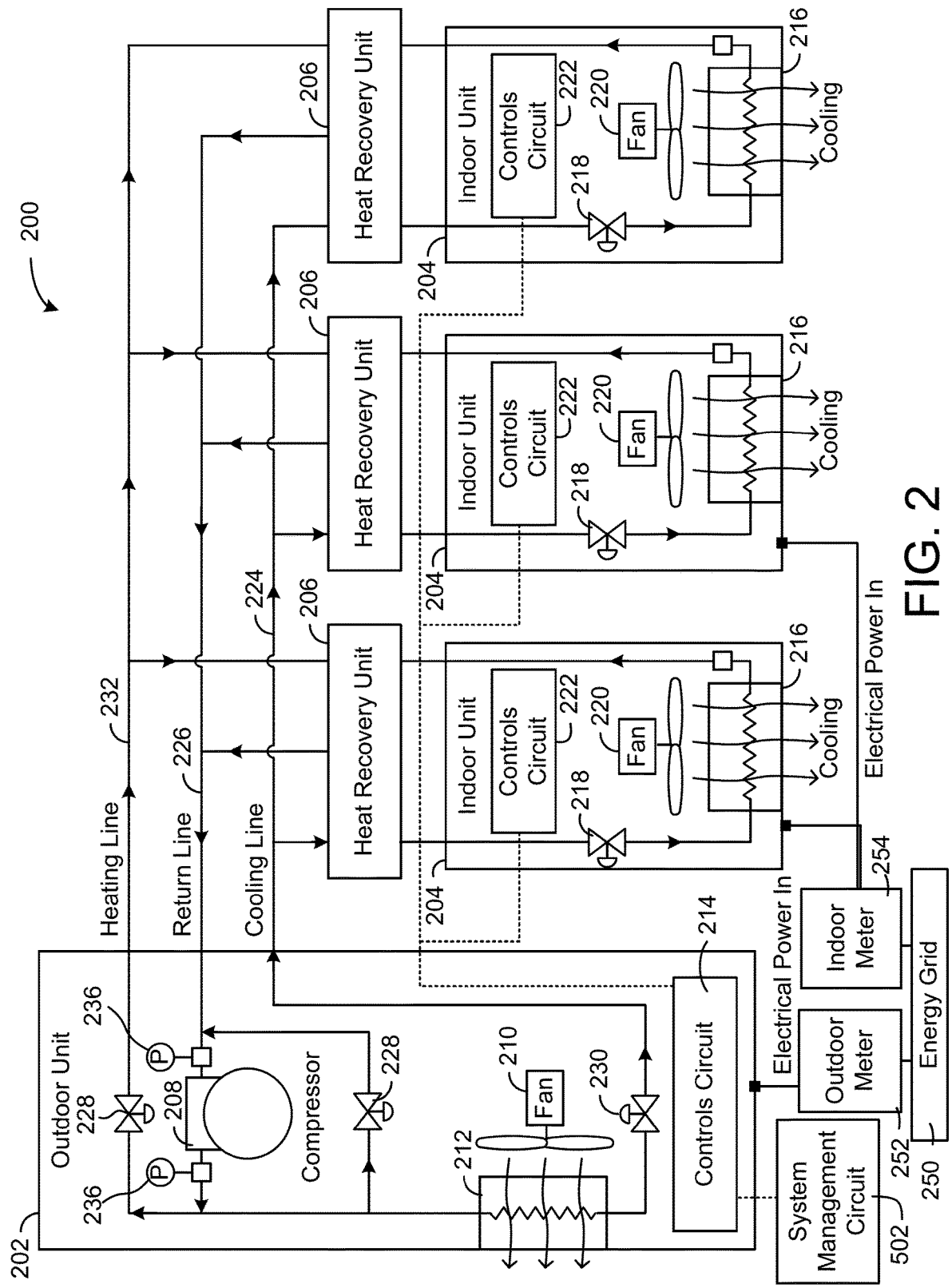
FIG. 2 is a detailed diagram of a variable refrigerant flow system, according to an exemplary embodiment.

Referring now to FIG. 2, a block diagram illustrating a VRF system 200 is shown, according to some embodiments. VRF system 200 is shown to include outdoor VRF unit 202, several heat recovery units 206, and several indoor VRF units 204. Outdoor VRF unit 202 may include a compressor 208, a fan 210, or other power-consuming refrigeration components configured convert a refrigerant between liquid, gas, and/or super-heated gas phases. Indoor VRF units 204 can be distributed throughout various building zones within a building and can receive the heated or cooled refrigerant from outdoor VRF unit 202. Each indoor VRF unit 204 can provide temperature control for the particular building zone in which the indoor VRF unit 204 is located. Heat recovery units 206 can control the flow of a refrigerant between outdoor VRF unit 202 and indoor VRF units 204 (e.g., by opening or closing valves) and can minimize the heating and/or cooling load to be served by outdoor VRF unit 202.

Outdoor VRF unit 202 is shown to include a compressor 208 and a heat exchanger 212. Compressor 208 circulates a refrigerant between heat exchanger 212 and indoor VRF units 204. The compressor 208 operates at a variable frequency as controlled by outdoor unit controls circuit 214. At higher frequencies, the compressor 208 provides the indoor VRF units 204 with greater heat transfer capacity. Electrical power consumption of compressor 208 increases proportionally with compressor frequency.

Heat exchanger 212 can function as a condenser (allowing the refrigerant to reject heat to the outside air) when VRF system 200 operates in a cooling mode or as an evaporator (allowing the refrigerant to absorb heat from the outside air) when VRF system 200 operates in a heating mode. Fan 210 provides airflow through heat exchanger 212. The speed of fan 210 can be adjusted (e.g., by outdoor unit controls circuit 214) to modulate the rate of heat transfer into or out of the refrigerant in heat exchanger 212.

Each indoor VRF unit 204 is shown to include a heat exchanger 216 and an expansion valve 218. Each of heat exchangers 216 can function as a condenser (allowing the refrigerant to reject heat to the air within the room or zone) when the indoor VRF unit 204 operates in a heating mode or as an evaporator (allowing the refrigerant to absorb heat from the air within the room or zone) when the indoor VRF unit 204 operates in a cooling mode. Fans 220 provide airflow through heat exchangers 216. The speeds of fans 220 can be adjusted (e.g., by indoor unit controls circuits 222) to modulate the rate of heat transfer into or out of the refrigerant in heat exchangers 216.

In FIG. 2, indoor VRF units 204 are shown operating in the cooling mode. In the cooling mode, the refrigerant is provided to indoor VRF units 204 via cooling line 224. The refrigerant is expanded by expansion valves 218 to a cold, low pressure state and flows through heat exchangers 216 (functioning as evaporators) to absorb heat from the room or zone within the building. The heated refrigerant then flows back to outdoor VRF unit 202 via return line 226 and is compressed by compressor 208 to a hot, high pressure state. The compressed refrigerant flows through heat exchanger 212 (functioning as a condenser) and rejects heat to the outside air. The cooled refrigerant can then be provided back to indoor VRF units 204 via cooling line 224. In the cooling mode, flow control valves 228 can be closed and expansion valve 230 can be completely open.

In the heating mode, the refrigerant is provided to indoor VRF units 204 in a hot state via heating line 232. The hot refrigerant flows through heat exchangers 216 (functioning as condensers) and rejects heat to the air within the room or zone of the building. The refrigerant then flows back to outdoor VRF unit via cooling line 224 (opposite the flow direction shown in FIG. 2). The refrigerant can be expanded by expansion valve 230 to a colder, lower pressure state. The expanded refrigerant flows through heat exchanger 212 (functioning as an evaporator) and absorbs heat from the outside air. The heated refrigerant can be compressed by compressor 208 and provided back to indoor VRF units 204 via heating line 232 in a hot, compressed state. In the heating mode, flow control valves 228 can be completely open to allow the refrigerant from compressor 208 to flow into heating line 232.

As shown in FIG. 2, each indoor VRF unit 204 includes an indoor unit controls circuit 222. Indoor unit controls circuit 222 controls the operation of components of the indoor VRF unit 204, including the fan 220 and the expansion valve 218, in response to a building zone temperature setpoint or other request to provide heating/cooling to the building zone. For example, the indoor unit controls circuit 222 can generate a signal to turn the fan 220 on and off. Indoor unit controls circuit 222 also determines a heat transfer capacity required by the indoor VRF unit 204 and a frequency of compressor 208 that corresponds to that capacity. When the indoor unit controls circuit 222 determines that the indoor VRF unit 204 must provide heating and/or cooling of a certain capacity, the indoor unit controls circuit 222 then generates and transmits a compressor frequency request to the outdoor unit controls circuit 214 including the compressor frequency corresponding to the required capacity.

Outdoor unit controls circuit 214 receives compressor frequency requests from one or more indoor unit controls circuits 222 and aggregates the requests, for example by summing the compressor frequency requests into a compressor total frequency. In some embodiments, the compressor frequency has an upper limit, such that the compressor total frequency cannot exceed the upper limit. The outdoor unit controls circuit 214 supplies the compressor total frequency to the compressor, for example as an input frequency given to a DC inverter compressor motor of the compressor. The indoor unit controls circuits 222 and the outdoor unit controls circuit 214 thereby combine to modulate the compressor frequency to match heating/cooling demand. The outdoor unit controls circuit 214 may also generate signals to control valve positions of the flow control valves 228 and expansion valve 230, a compressor power setpoint, a refrigerant flow setpoint, a refrigerant pressure setpoint (e.g., a differential pressure setpoint for the pressure measured by pressure sensors 236), on/off commands, staging commands, or other signals that affect the operation of compressor 208, as well as control signals provided to fan 210 including a fan speed setpoint, a fan power setpoint, an airflow setpoint, on/off commands, or other signals that affect the operation of fan 210.

Indoor unit controls circuits 222 and outdoor unit controls circuit 214 may store and/or provide a data history of one or more control signals generated by or provided to the controls circuits 214, 222. For example, indoor unit controls circuits 222 may store and/or provide a log of generated compressor request frequencies, fan on/off times, and indoor VRF unit 204 on/off times. Outdoor unit controls circuit 214 may store and/or provide a log of compressor request frequencies and/or compressor total frequencies and compressor run-times.

The VRF system 200 is shown as running on electrical power provided by an energy grid 250 via an outdoor meter 252 and an indoor meter 254. According to various embodiments, the energy grid 250 is any supply of electricity, for example an electrical grid maintained by a utility company and supplied with power by one or more power plants. The outdoor meter 252 measures the electrical power consumption over time of the outdoor VRF unit 202, for example in kilowatt-hours (kWh). The indoor meter 254 measures the electrical power consumption over time of the indoor VRF units 204, for example in kWh. The VRF system 200 incurs energy consumption costs based on the metered electrical power consumption of the outdoor meter 252 and/or the indoor meter 254, as billed by the utility company that provides the electrical power. The price of electrical power (e.g., dollars per kWh) may vary over time.

The VRF system 200 also includes a system management circuit 502. As described in detail below with reference to FIGS. 6-13, the system management circuit 502 is configured to minimize energy consumption costs for the VRF system 200 while also maintaining occupant comfort.

Window Air Conditioner

Figure 3:
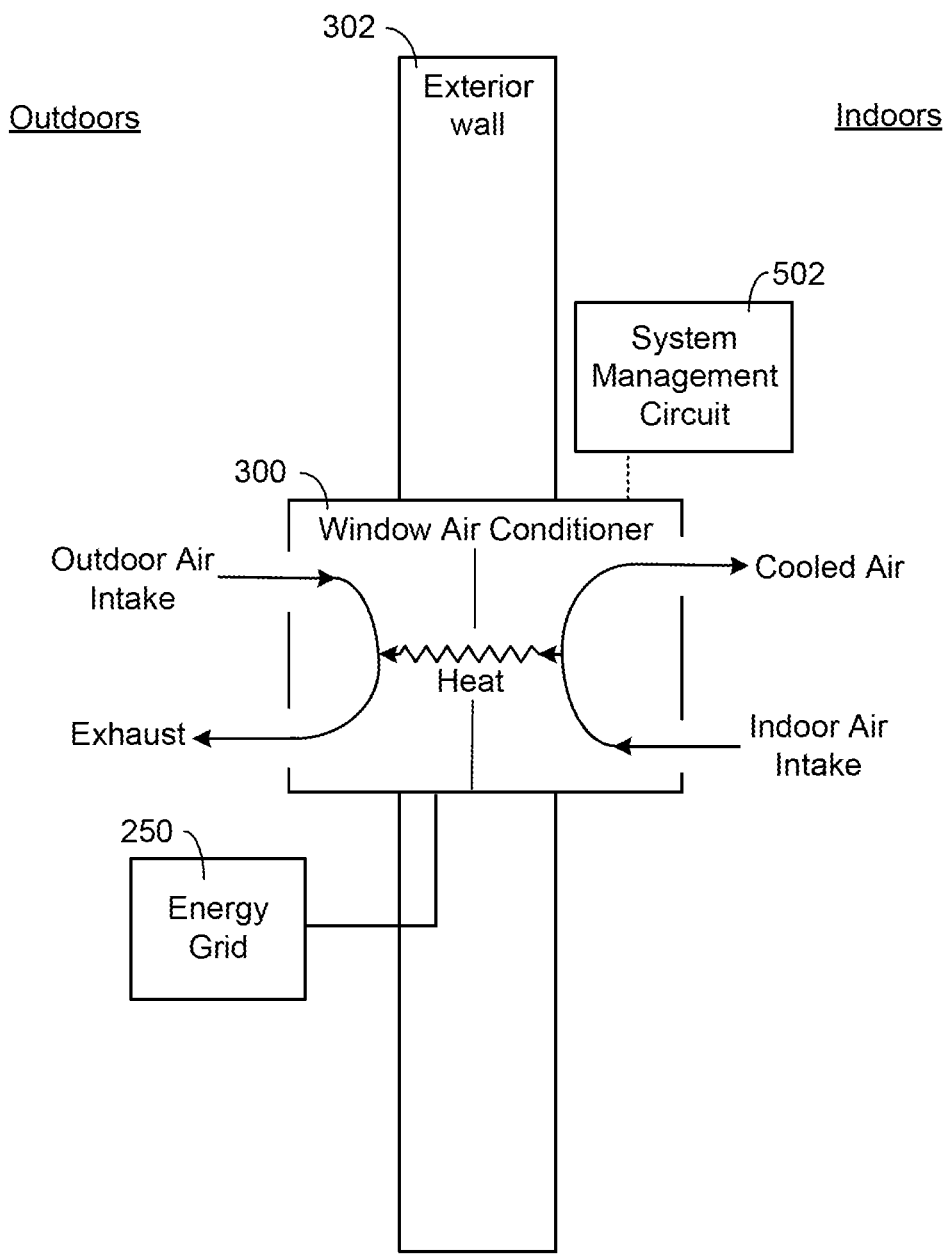
FIG. 3 is a block diagram of a window air conditioner, according to an exemplary embodiment.

Referring now to FIG. 3, a window air conditioner 300 is shown, according to an exemplary embodiment. The window air conditioner 300 is configured to be mounted in a window of a building, such that the window air conditioner 300 extends across an exterior wall 302 of the building. The window air conditioner 300 can thereby provide airflow to and/or receive air from both indoors (i.e., inside a building) and outdoors (i.e., outside of a building). A window air conditioner 300 is sometimes also referred to in the art as a room air conditioner.

The window air conditioner 300 acts as a heat pump to transfer heat from the indoor air to the outdoor air. As shown in FIG. 3, the window air conditioner 300 intakes indoor air and outputs cooled air into the room. The window air conditioner 300 also intakes outdoor air and outputs exhaust outside of the building. The window air conditioner 300 may include a compressor, a condenser, an evaporator, and one or more fans to facilitate the transfer of heat across the exterior wall 302 (i.e., from indoors to outdoors). The window air conditioner 300 is thereby configured to cause the temperature of the indoor air to decrease towards a temperature setpoint.

The window air conditioner 300 consumes electrical power from the energy grid 250 when operating to transfer heat across the exterior wall 302. The window air conditioner 300 may be controllable to operate at various powers to provide various levels of cooling to the building, for example based on a temperature setpoint. The window air conditioner 300 may also turn on and off as needed. The window air conditioner 300 therefore consumes more electrical power when providing more cooling and less electrical power when providing less cooling.

The system management circuit 502 is communicably coupled to the window air conditioner 300 to provide control signals for the window air conditioner 300 and to receive data from the window air conditioner 300. For example, the system management circuit 502 may provide a temperature setpoint to the window air conditioner 300. The system management circuit 502 is described in detail with reference to FIGS. 6-13. In some embodiments, the system management circuit 502 is integrated into the window air conditioner 300. In some embodiments, the system management circuit 502 operates remotely (e.g., on cloud server) and/or serves multiple window air conditioners 300.

Room Air Conditioning System

Figure 4:
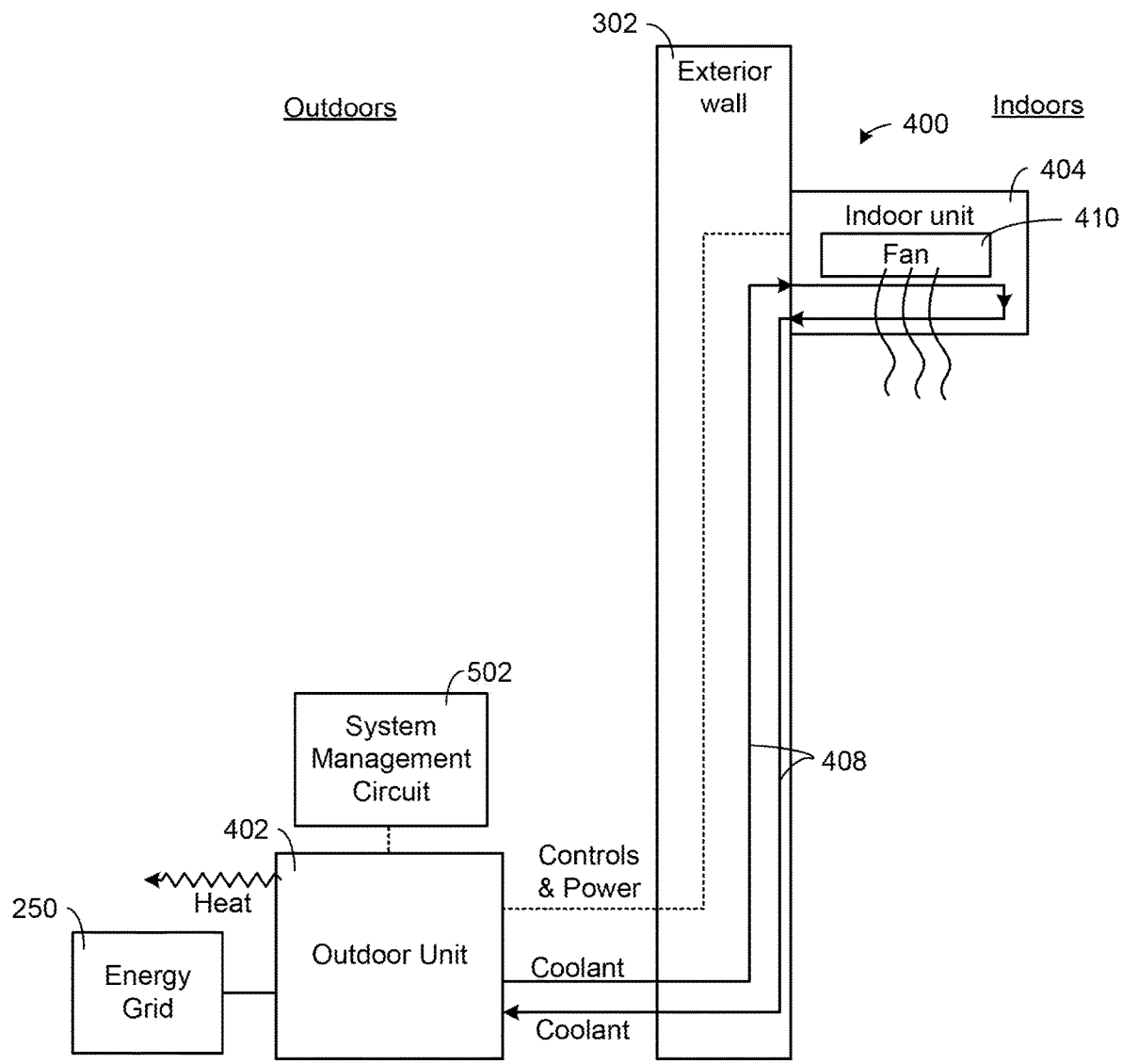
FIG. 4 is a block diagram of a room air conditioning system, according to an exemplary embodiment.

Referring now to FIG. 4, a room air conditioning system 400 is shown, according to an exemplary embodiment. The room air conditioning system 400 provides cooling for a room of a building. The room air conditioning system 400 includes in outdoor unit 402 and an indoor unit 404. The outdoor unit 402 is located outside of the building while the indoor unit 404 is located inside of the building, such that the indoor unit 404 is separated from the outdoor unit 402 by an exterior wall 302 of the building. The indoor unit 404 may be mounted on an indoor surface of the exterior wall 302. The indoor unit 404 and the outdoor unit 402 are communicably coupled to exchange control signals and data. The indoor unit 404 may also receive electrical power via the outdoor unit 402, or vice versa.

The outdoor unit 402 consumes electrical power from the energy grid 250 to cool a coolant. The coolant is then forced through pipe 408, which runs through the exterior wall 302 from the outdoor unit 402 to the indoor unit 404. A fan 410 blows air from the room across the pipe 408 to transfer heat from the room to the coolant. The coolant then flows back to the outdoor unit 402 where it is re-cooled for circulation back to the indoor unit 404. The room air conditioning system 400 thereby operates to transfer heat across the exterior wall 302 from indoors to outdoors.

The outdoor unit 402 and the indoor unit 404 may be controlled to track a temperature setpoint for the room. For example, the outdoor unit 402 may be controlled to run at various powers to provide variable rates of coolant flow and/or various coolant temperatures to the indoor unit 404. The fan 410 may be controlled to operate at various speeds. The room air conditioning system 400 is also controllable to turn on and off as needed. Accordingly, the room air conditioning system 400 consumes more electrical power from the energy grid 250 when it provides more cooling to the room.

The system management circuit 502 is communicably coupled to the outdoor unit 402 and/or the indoor unit 404 to provide control signals for the room air conditioning system 400 and to receive data from the room air conditioning system 400. For example, the system management circuit 502 may provide a temperature setpoint to the room air conditioning system 400. The system management circuit 502 is described in detail with reference to FIGS. 6-13. In some embodiments, the system management circuit 502 is integrated into the outdoor unit 402 and/or the indoor unit 404. In some embodiments, the system management circuit 502 operates remotely (e.g., on cloud server) and/or serves multiple room air conditioning systems 400.

Packaged Air Conditioner

Figure 5:
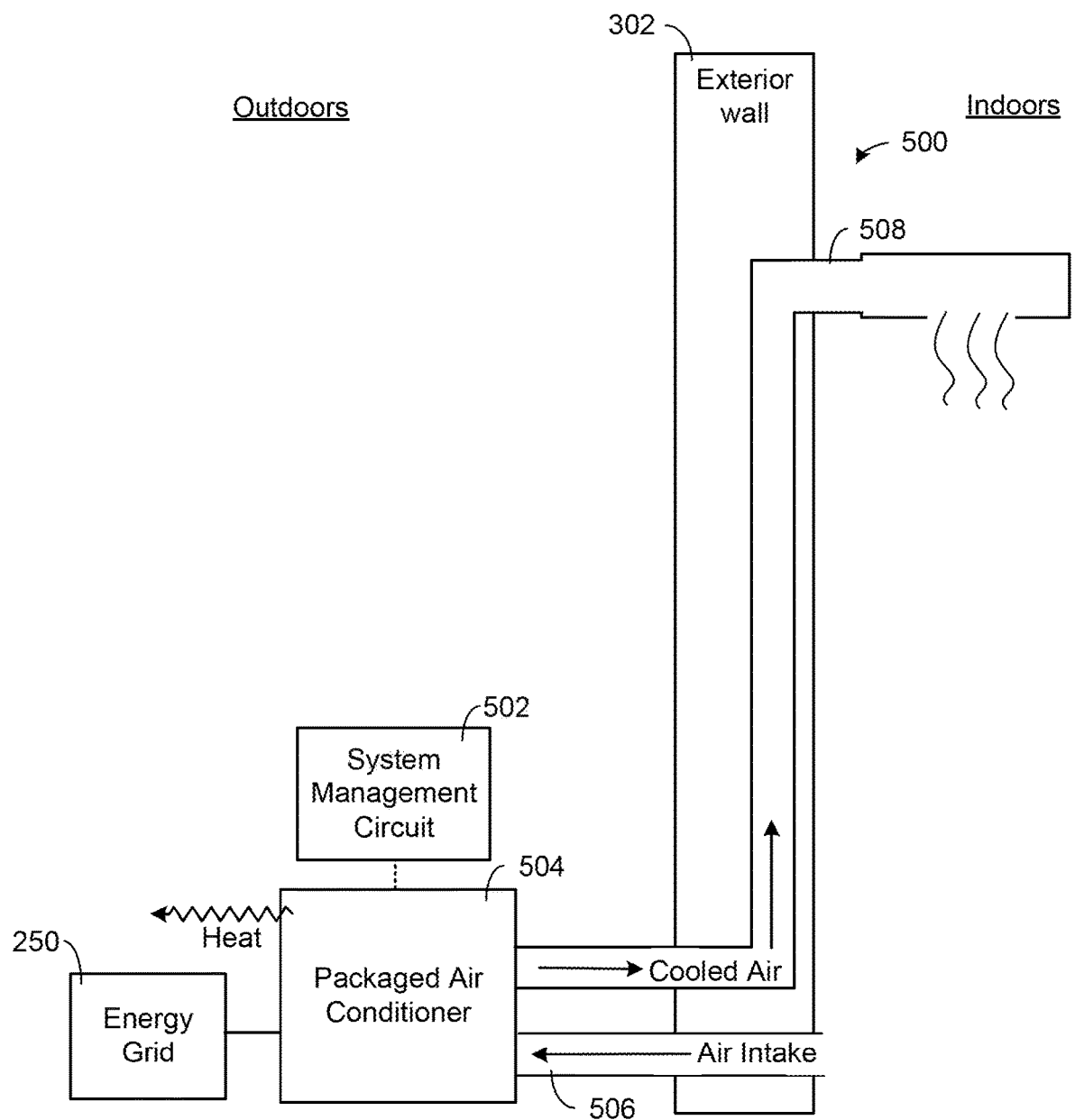
FIG. 5 is a block diagram of a packaged air conditioner system, according to an exemplary embodiment.

Referring now to FIG. 5, a packaged air conditioning system 500 is shown, according to an exemplary embodiment. The packaged air conditioning system 500 includes a packaged air conditioner 504, an air intake vent 506, and a cooled air duct 508. The packaged air conditioner 504 is located outdoors while the air intake vent 506 and the cooled air duct 508 extend from the packaged air conditioner 504 through the exterior wall 302 of a building to allow air to flow between the packaged air conditioner 504 and the inside of the building.

The packaged air conditioning system 500 consumes electrical power from energy grid 250 to draw in indoor air from inside the building through the air intake vent 506, remove heat from the indoor air to cool the air, and provide the cooled air to the cooled air duct 508. The packaged air conditioning system 500 expels the heat to the outdoor air. The cooled air duct 508 allows the cooled air to flow across the exterior wall 302 and into the air in the building to lower the indoor air temperature of the building.

The packaged air conditioner 504 may be controlled to track a temperature setpoint for the building. For example, the packaged air conditioner 504 may be operated at various powers to provide various temperatures of cooled air and/or various flow rates of cooled air to the cooled air duct 508. The packaged air conditioner 504 consumes more electrical power from the energy grid 250 when it provides more cooling to the room, by operating at a higher rate of power consumption and/or by operating for more time.

The system management circuit 502 is communicably coupled to the packaged air conditioner 504 to provide control signals for the room air conditioning system 400 and to receive data from the packaged air conditioner 504. For example, the system management circuit 502 may provide a temperature setpoint to the packaged air conditioner 504. The system management circuit 502 is described in detail with reference to FIGS. 6-13. In some embodiments, the system management circuit 502 is integrated into the packaged air conditioner 504. In some embodiments, the packaged air conditioner 504 operates remotely (e.g., on cloud server) and/or serves multiple room air conditioning systems 400.

System Management Circuit with Model Predictive Control

Figure 6:
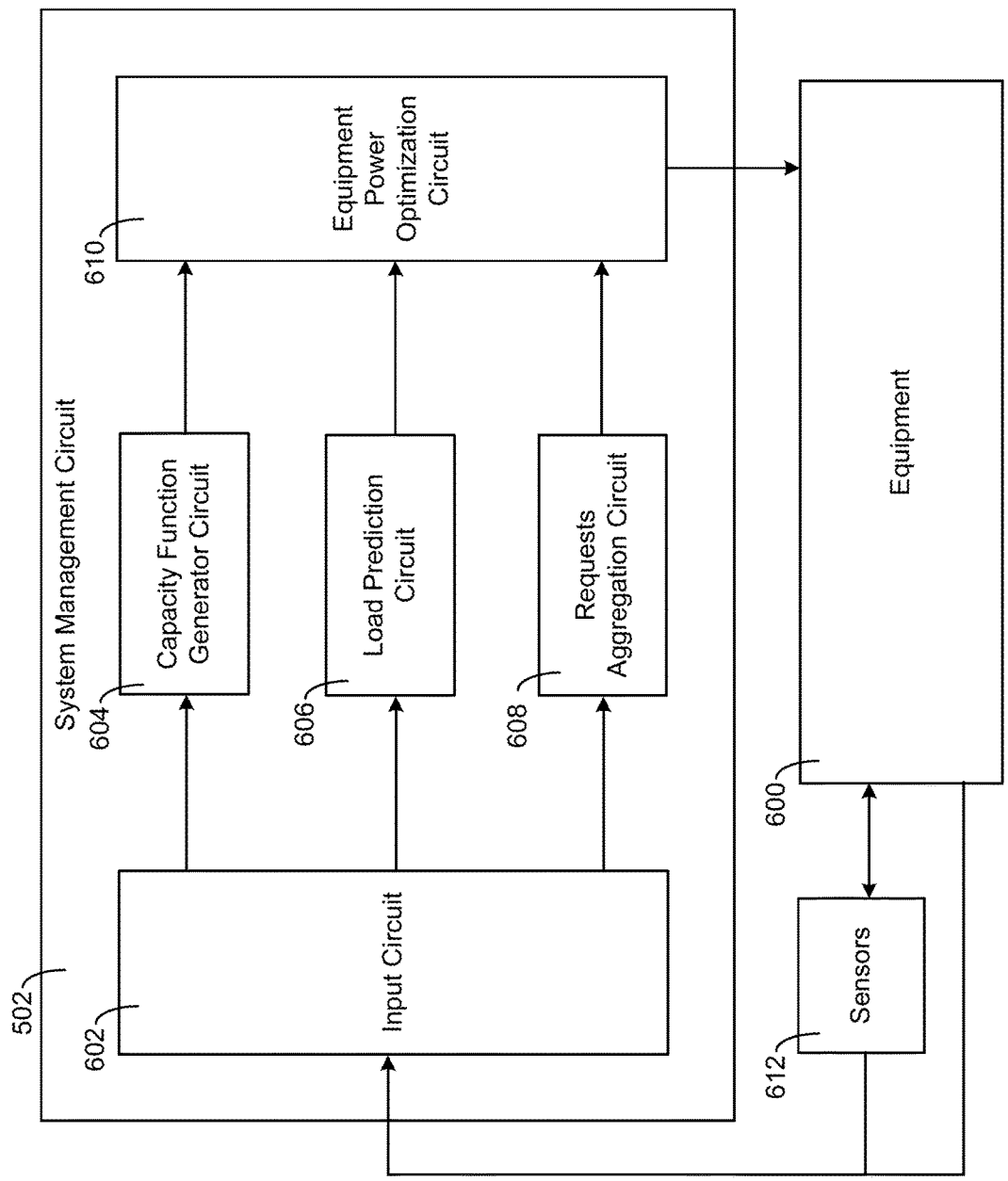
FIG. 6 is a block diagram of a system management circuit for use with a variable refrigerant flow system, a room air conditioner, a window air conditioner, or a packaged air conditioner, according to an exemplary embodiment.
Figure 7:
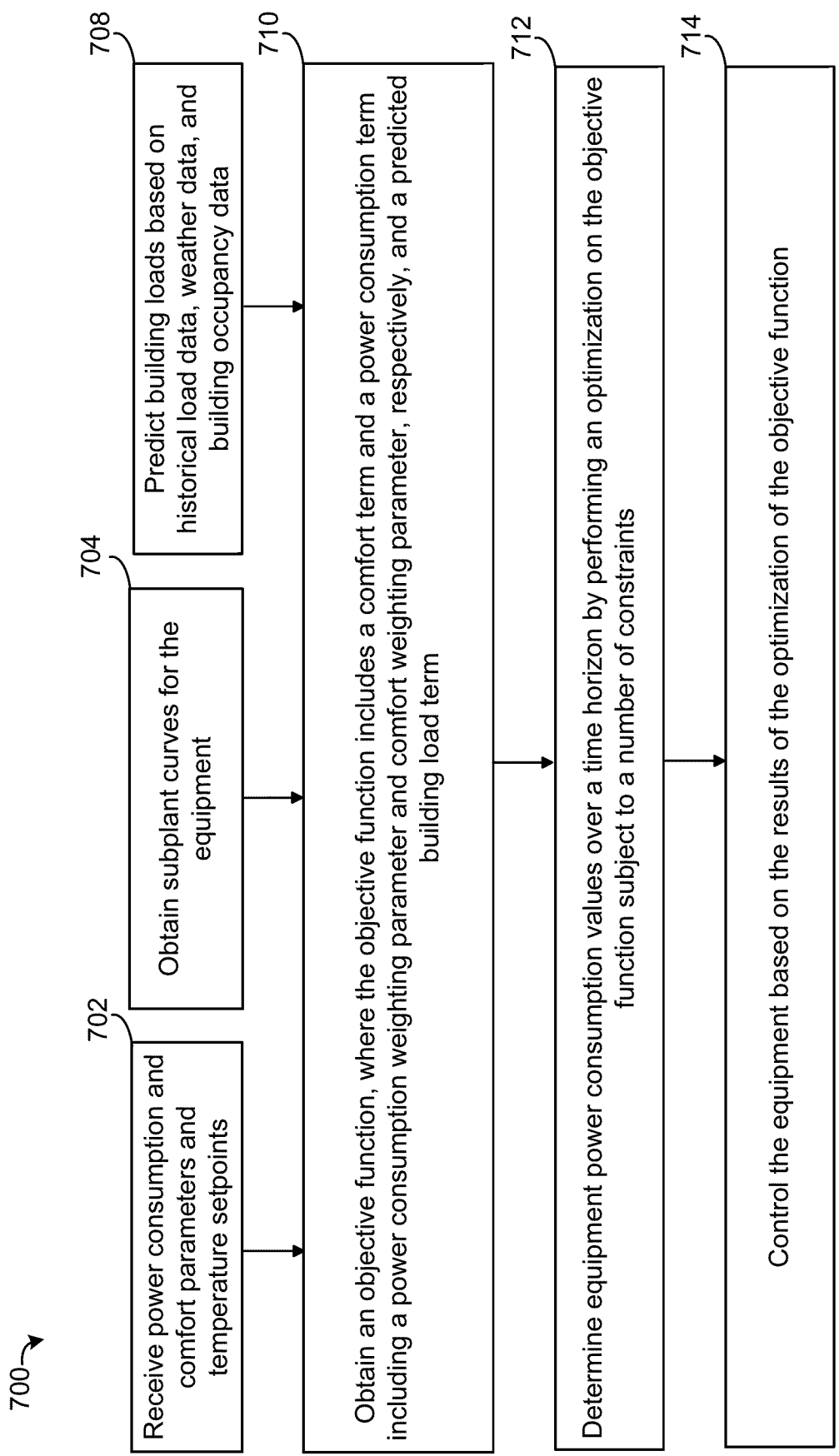
FIG. 7 is a flow chart illustrating a method of controlling a variable refrigerant flow system, a room air conditioner, a window air conditioner, or a packaged air conditioner, according to an exemplary embodiment.

Referring now to FIG. 6, a block diagram illustrating the system management circuit 502 in greater detail is shown, according to an exemplary embodiment. As described below, the system management circuit 502 can be configured to determine power consumption values of equipment 600 by optimizing an objective function over a time horizon. The system management circuit 502 can control the equipment 600 based on the power consumption values determined through the optimization. For example, the system management circuit 502 may limit the power consumption of the outdoor VRF unit 102 to a determined value for a time step to maximize energy efficiency of the outdoor VRF unit 102. Limiting power consumption may cause the outdoor VRF unit 102 to operate at a higher coefficient of performance, thereby reducing energy consumption and utility costs.

The system management circuit 502 may be communicably coupled to the equipment 600 and sensors 612. According to various embodiments, the equipment 600 includes the VRF system 100 of FIGS. 1A-1B, the VRF system 200 of FIG. 2, the window air conditioner 300 of FIG. 3, the room air conditioning system 400 of FIG. 4, and/or the packaged air conditioning system 500 of FIG. 5. In some embodiments, a user device may be included with the equipment 600. The user device may be a smartphone, a tablet, a laptop computer, and/or any other mobile and/or stationary computing device, which is communicably coupled to system management circuit 502. The equipment 600 is operable to affect the indoor air temperature of one or more of a room, multiple rooms, a building, multiple buildings, etc. The sensors 612 provide measurements that facilitate the operation of the equipment 600 and system management circuit 502. The sensors 612 may measure the indoor air temperature of a room or building, an outdoor air temperature, and or a humidity of a room or building.

The system management circuit 502 is shown to include an input circuit 602, a capacity function generator circuit 604, a load prediction circuit 606, a requests aggregation circuit 608, and an equipment power optimization circuit 610. The input circuit 602 is configured to receive data from the equipment 600 and the sensors 612, including, but not limited to, heating and/or cooling loads, power consumption, occupancy, temperature setpoints, weather, power consumption and comfort parameter values, building schedules, user inputs, and other data. Once received, the input circuit 602 may manipulate data, such as summing power consumption data from the equipment 600 into an aggregate power consumption, for example. The input circuit 602 may also determine how received data is distributed to the components of the system management circuit 502. For example, data such as weather and occupancy may be sent to the load prediction circuit 606, while data (i.e., user inputs) on power consumption and comfort parameters values may be sent to the requests aggregation circuit 608.

The capacity function generator circuit 604 may be configured to generate an efficiency function that defines the heating and/or cooling capacity of the equipment 600 as a function of the power consumption of the equipment 600, denoted herein as $Q_k = f(P_k)$, where $Q_k$ is the heating and/or cooling provided by the equipment 600, $P_k$ is the aggregated power consumption of the equipment 600, and k denotes a time step (e.g., increments of 15 minutes). $Q_k$ may be a vector containing a plurality of elements (e.g., $Q_1$, $Q_2$, ..., $Q_h$) where h is the total number of time steps in a time horizon. It will be appreciated that other variables denoted by the subscript k, mentioned herein, may also be vectors containing a plurality of elements, where h is the total number of time steps in the time horizon.

Figure 8A:
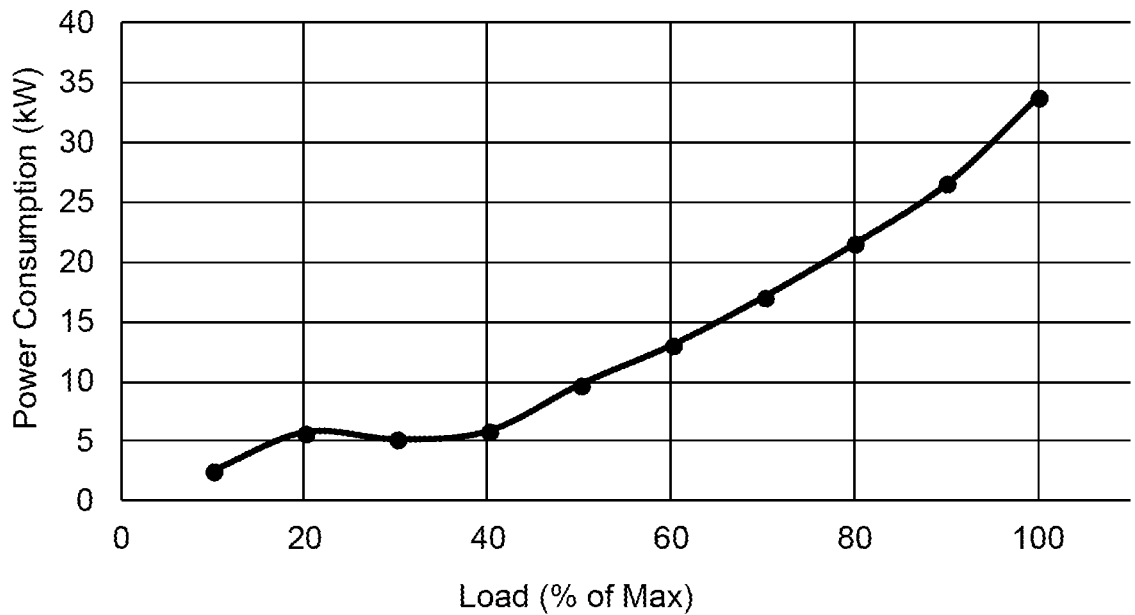
FIG. 8A is a graph of a subplant curve for a variable refrigerant flow system, a room air conditioner, a window air conditioner, or a packaged air conditioner system in a cooling condition, according to an exemplary embodiment.
Figure 8B:
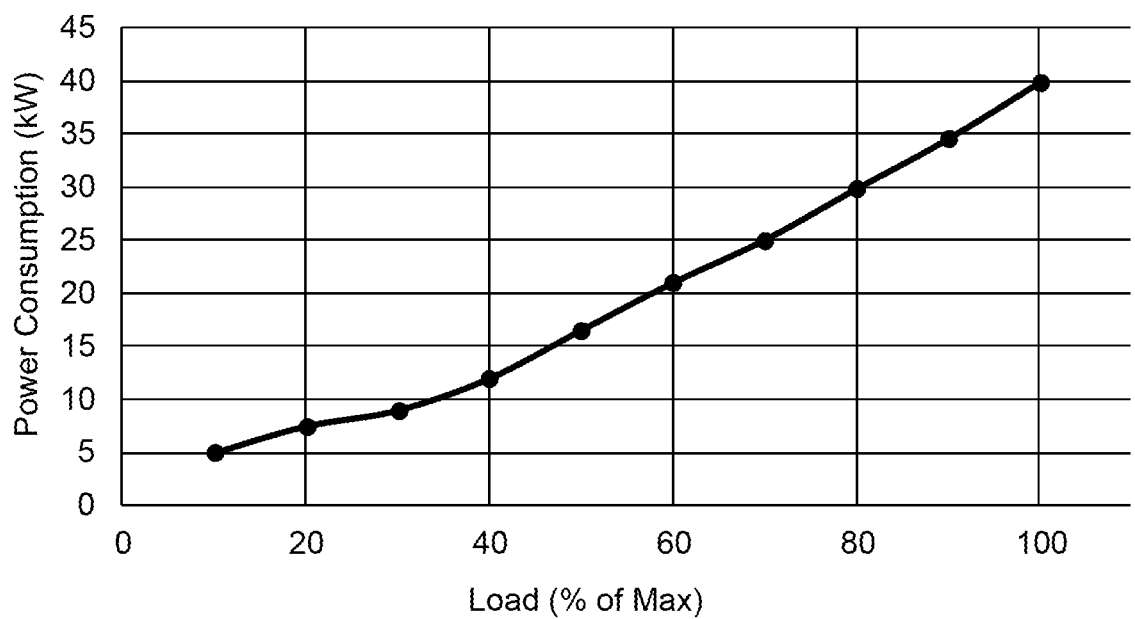
FIG. 8B is a graph of a subplant curve for a variable refrigerant flow system in a heating condition, according to an exemplary embodiment.

In other embodiments, the relationship between the generated heating and/or cooling of the equipment 600 and the power consumption for the equipment 600 is known (e.g., pre-programmed based on manufacturer specifications), as shown in FIGS. 8A-8B which are described in detail in subsequent paragraphs. In some embodiments, the relationship between generated heating and/or cooling of the equipment 600 and the power consumption of the equipment 600 may be determined based on historical data, current readings of the sensors 612, individual component specifications of the equipment 600, or a predictive model.

The load prediction circuit 606 is configured to predict the aggregate heating and/or cooling load of all building zones, using data from the input circuit 602 data such as heating and/or cooling load data, occupancy, and weather information. The load predictions are denoted herein as $Qload_k$, where k denotes a time step. The load prediction circuit 606 may be configured to generate $Qload_k$ based on an autoregressive model, a machine-learning algorithm, a state-space model, a combination of stochastic and deterministic models as described in U.S. patent application Ser. No. 14/717,593 filed May 20, 2015, which is incorporated by reference herein in its entirety, or some other predictive modeling approach.

In one embodiment, the requests aggregation circuit 608 is configured to generate temperature setpoints and determine values for a power consumption and/or comfort weighting parameter based on user input data. As defined in greater detail below, the power consumption weighting parameter and comfort weighting parameter may be variables used to weight a power consumption term and/or a comfort term of an objective function. A user may input temperature setpoints and/or the power consumption and comfort weighting parameters via a user device (smartphone, room thermostat, etc.). In some such embodiments, a user may select a preference for maintaining temperature setpoints or a preference for decreasing power consumption (e.g., a dichotomous selection, a selection on a continuous scale between options, a selection of one of several discrete steps between options), where the requests aggregation circuit 608 quantifies this decision and determines a weight for the power consumption and comfort weighting parameters. For example, a user may command a preference to prioritize lower power consumption over maintaining temperature setpoints throughout VRF system 100. In this example, the requests aggregation circuit 608 will assign the power consumption weighting parameter a higher value than the comfort weighting parameter. A user may also set power consumption and comfort weighting parameters directly, rather than selecting a preference.

In another embodiment, the requests aggregation circuit 608 may be configured to store temperature setpoints, schedules (e.g., time series of temperature setpoints), and power consumption and/or comfort parameters. The requests aggregation circuit 608 may store user-defined temperature setpoints, schedules, and/or power consumption and comfort parameters. Temperature setpoints and/or power consumption and comfort parameters may also be stored on the requests aggregation circuit as predetermined values, generally determined based on the equipment 600 specifications, historical building data, or other data. Power consumption and/or weight parameters may also be adjusted based on user schedules. For example, a building serviced by VRF system 100 may have a low occupancy at night, which may be reflected in a schedule that is stored on the requests aggregation circuit 608. In this example, the requests aggregation circuit 608 may assign the power consumption parameter a higher value during times of low occupancy, when maintaining temperature setpoints is not as critical as lower energy consumption.

The equipment power optimization circuit 610 is configured to generate an objective function that includes a power consumption term and a comfort term. In some embodiments, the power consumption term is defined by the aggregate power consumption of the equipment 600 and the comfort term is defined by the temperature error value. In such embodiments, the objective function can be represented by:

$$J(P) = \frac{1}{2}\sum_{k=1}^{h} (q_k(T_k - Tsp_k)^2 + r_k P_k^2)$$

where $Tsp_k$ is the average (e.g., mean, weighted average, etc.) temperature setpoint across multiple building zones at time step k, h is the optimization horizon, and $q_k$ and $P_k$ are weighting parameters for the comfort term and power consumption term, respectively.

In one embodiment, the power consumption weighting parameter is assigned a larger value than the comfort weighting parameter, thereby reducing the influence of the comfort term on the overall value of the objective function. In another embodiment, the comfort weighting parameter is assigned a larger value than the power consumption weighting parameter, thereby increasing the objective function's response to temperature error. In other embodiments, one of the power consumption or comfort weighting parameters is assigned a value of one (or, equivalently, is omitted), and the value of the remaining weighting parameter determines the objective function's response to power consumption or temperature error.

In other embodiments, the equipment power optimization circuit 610 may be configured to generate an objective function that includes an efficiency term and a comfort term, where the comfort term is defined by the temperature error value. The efficiency term may be defined as the coefficient of performance of the equipment (e.g., equipment 600) or another variable that represents that efficiency of the equipment 600 at a time step k. In such embodiments, the objective function can be represented by:

$$J(P) = \frac{1}{2}\sum_{k=1}^{h} (q_k(T_k - Tsp_k)^2 - \eta_k^2)$$

where $Tsp_k$ is the average (e.g., mean, weighted average, etc.) temperature setpoint across multiple building zones at time step k, h is the optimization horizon, $q_k$ is a weighting parameter for the comfort term, and $\eta_k$ is the efficiency term.

In some embodiments, $\eta_k$ may be defined as $\eta_k = COP_k$, where $COP_k$ is the coefficient of performance of the equipment (e.g., equipment 600) at a time step k. The coefficient of performance of the equipment 600 may be defined as the ratio of heating and/or cooling generated by the equipment 600 (i.e., load production) to power (i.e., resource) consumption. Generally, the coefficient of performance may be defined as:

$$COP_k = \frac{Q_k}{P_k}$$

where $Q_k$ is the amount of heating and/or cooling generated by the equipment and $P_k$ is the aggregate power consumption of the equipment 600. It follows that the coefficient of performance of the equipment 600 may be represented as $COP_k = f(Q_k, P_k)$.

Figure 10A:
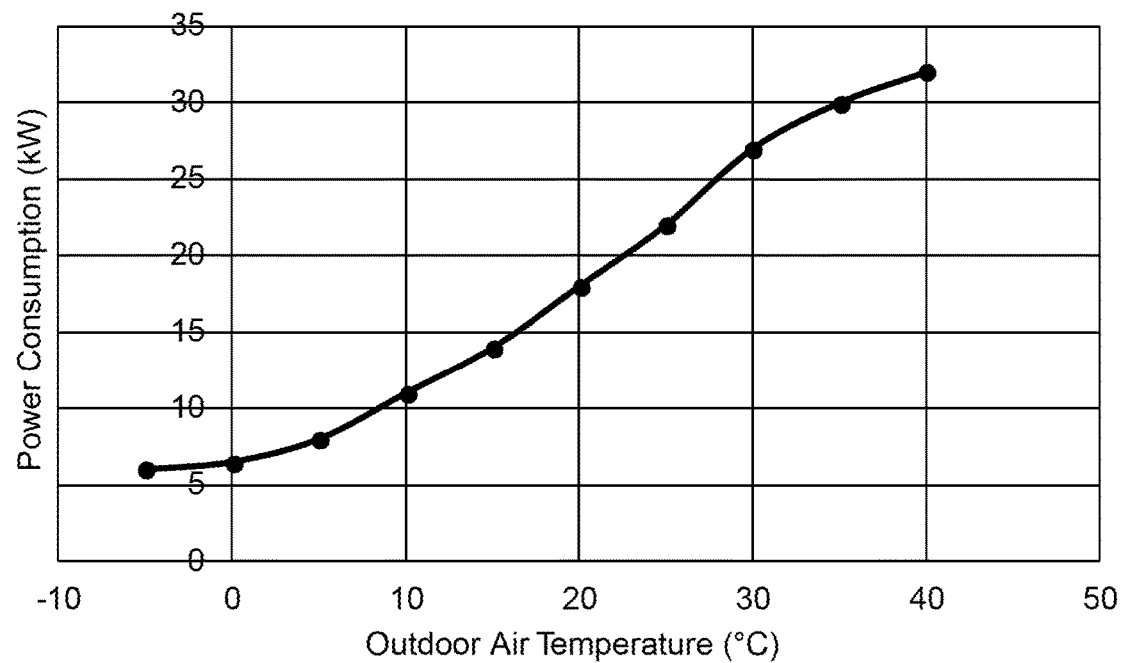
FIG. 10A is a graph of the power consumption as a function of outdoor air temperature for a variable refrigerant flow system, a room air conditioner, a window air conditioner, or a packaged air conditioner system in a cooling condition, according to an exemplary embodiment.
Figure 10B:
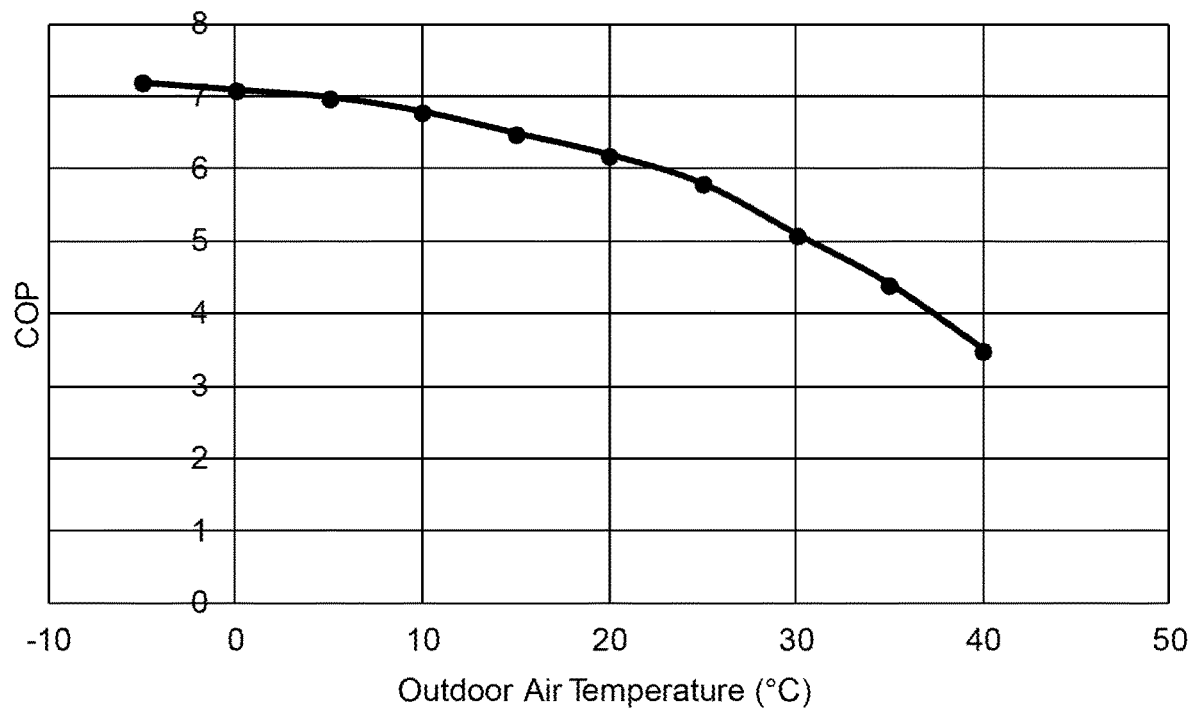
FIG. 10B is a graph of the coefficient of performance as a function of outdoor air temperature for a variable refrigerant flow system, a room air conditioner, a window air conditioner, or a packaged air conditioner system in a cooling condition, according to an exemplary embodiment.
Figure 11A:
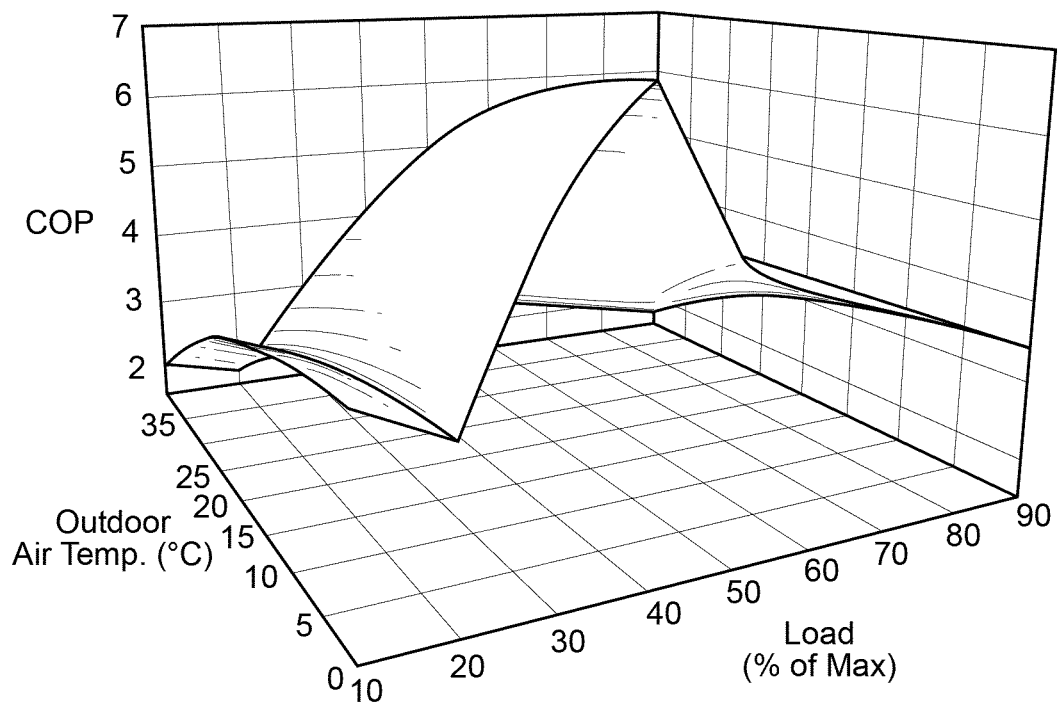
FIG. 11A is a graph of the coefficient of performance as a function of outdoor air temperature and equipment load for a variable refrigerant flow system, a room air conditioner, a window air conditioner, or a packaged air conditioner system in a cooling condition, according to an exemplary embodiment.
Figure 11B:
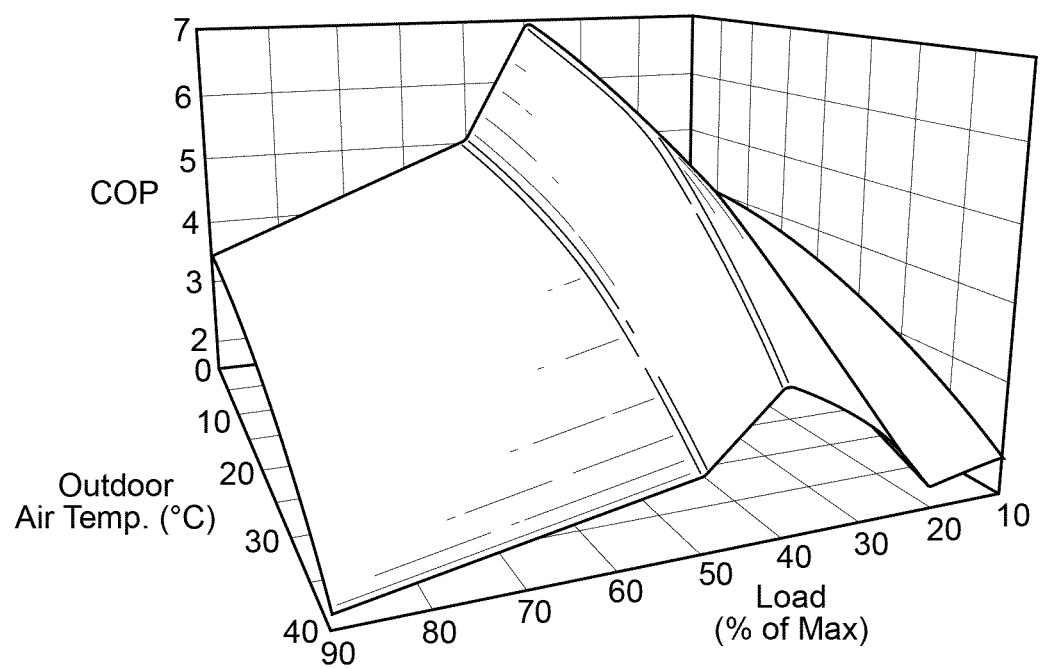
FIG. 11B is the graph of FIG. 11A, when viewed from an alternate perspective, according to an exemplary embodiment.

In other embodiments, the aggregate power consumption of the equipment 600 may be affected by another variable, such as the outdoor air temperature, denoted herein as $OAT_k$. In such embodiments, $P_k$ may be defined as $P_k = f(OAT_k)$, as shown in FIG. 10A, described in detail below. It follows that the coefficient of performance may then be defined as $COP_k = f(Q_k, OAT_k)$, as shown in FIG. 10B and FIGS. 11A-11B, described in detail below.

In one embodiment, the temperature error value is defined as the difference between the prediction of the temperature of the building and a temperature setpoint for the building (i.e., $T_k - Tsp_k$). The temperature setpoints are taken as known (e.g., as input by a user or determined by a schedule stored by the requests aggregation circuit 608). The building temperature prediction, $T_k$, may be obtained using a predictive thermal model, for example represented as:

$$T_k = \left(1 - \frac{1}{RC_z}\right)T_{k-1} + \frac{1}{RC_z}T_{m,k-1} - \frac{1}{C_z}Q_k + \frac{1}{C_z}Qload_k$$

$$T_{m,k} = \frac{1}{RC_m}T_{k-1} + \left(1 - \frac{1}{RC_m}\right)T_{m,k-1}$$

where $T_k$ is the building temperature prediction (indoor air temperature), $T_{m,k}$ is an unmeasured variable which represents the building mass temperature at time step k, $C_z$ is a constant relating to zone volumes and air heat capacity (e.g., thermal capacity of the air within the building zone), R is the heat transfer coefficient between the building mass and a zone, and $C_m$ is the building mass and heat capacity (e.g., thermal capacity of the solid mass within the building zone). As described above, $Qload_k$ is the predicted building load as predicted by the load prediction circuit 606, while $Q_k$ denotes the heat or cooling provided by the equipment 600.

In one embodiment, $Q_k$ is defined using the efficiency function $Q_k=f(P_k)$ obtained by the capacity function generator circuit 604. By plugging $Q_k$ as defined above into the predictive thermal model, it can be seen that the temperature predictions $T_k$ are determined as a function of the power consumption $P_k$. It follows that the temperature error term of the objective function $(T_k-Tsp_k)^2$ is a function of the power consumption $P_k$ and is calculated based on the efficiency function $Q_k=f(P_k)$.

The equipment power optimization circuit 610 utilizes the generated objective function to determine values of the power consumption $P_k$ of the equipment 600 by optimizing the objective function over a time horizon. In optimizing the objective function, the equipment power optimization circuit 610 determines a value of the power consumption, P, for each time step k over time horizon h, such that the value of J(P) of the objective functions shown above is minimized according to a number of constraints. For example, the predictive thermal model presented above (i.e., $T_k$), $Qload_k$, and/or $Q_k$ may be implemented as constraints on the optimization of J(P). These constraints prevent the optimization circuit 610 from determining a value of P that violates said constraints. Other constraints limit the value of P, such that $P \leq P_{max}$, where $P_{max}$ is the maximum power of the equipment 600. $T_k$ may be limited such that $T_{min}<T_k<T_{max}$, where, $T_{min}$ and $T_{max}$ are minimum and maximum temperature setpoints, respectively, that constrain $T_k$ such that the comfort term of the objective function will not be driven to uncomfortable levels.

In some embodiments, the equipment power optimization circuit 610 controls the power consumption of the equipment 600. In optimizing the objective function over a time horizon, the equipment power optimization circuit 610 determines a power consumption value for the equipment 600 (i.e., P), at current and future time intervals. The power consumption of the equipment 600 may then be regulated by the equipment power optimization circuit 610 to maintain the equipment 600 load such that the power consumption of the equipment 600 remains near P. In other embodiments, the equipment power optimization circuit 610 maintains the equipment 600 load such that the power consumption of the equipment 600 does not exceed P.

By regulating power consumption, the system management circuit 502 causes the equipment 600 to operate at a high coefficient of performance rather than at maximum power. This improvement will reduce the inefficiency associated with associated with starting and stopping components of the equipment 600 as well as the inefficiency associated with operating the equipment 600 continuously. For example, a packaged air conditioner 504 may have a high coefficient of performance at 40% of its maximum load. If the power consumption of the unit is prioritized, the objective function will be generated and optimized with a larger power consumption weighting parameter value. The equipment power optimization circuit 610 will maintain the load of the packaged air conditioner near 40% to maximize its efficiency, which may result in a delay in reaching a desired temperature setpoint but providing energy savings. In other examples, comfort may be prioritized and the equipment power optimization circuit 610 may regulate the packaged air conditioner 504 at a higher load (i.e., lower coefficient of performance) in the interest of achieving desired temperature setpoints more quickly.

In some embodiments, the control of the equipment 600 loads by the equipment power optimization circuit 610 may be a supervisory control, with the achievement of temperature setpoints left to controllers of the equipment 600. For example the equipment power optimization circuit 610 may output power consumption values as the output of the optimization process described above, and provide these values as maximum power consumption values to controllers of the equipment 600 (e.g., controls circuit 214, controls circuits 222). The controllers of the equipment 600 may use the power consumption values as caps (maximum constraints) on power consumption of the equipment 600, i.e., thereby preventing the equipment 600 from exceeding the amount of power consumption determined by the system management circuit 502 for a given time-step. For example, the controllers may use standard feedback control (e.g., PID control) or other control algorithms to drive the actual air temperature towards a temperature setpoint while preventing the equipment 600 from exceeding the amount of power consumption determined by the system management circuit 502 for the time-step Referring now to FIG. 7, a flow chart illustrates a process 700 of generating an objective function and controlling equipment loads based on an optimization of the generated objective function over a time horizon, according to some embodiments. Process 700 may be performed by the system management circuit 502, as shown in FIG. 6, for example. In some embodiments, process 700 may include additional, fewer, or different steps than shown in FIG. 7. Optimizing an objective function over a time horizon, as described in process 700, may help to improve the efficiencies of VRF, WAC, RAC, and PAC systems by helping to minimize the inefficiencies associated with frequent start/stop cycles of equipment and by allowing equipment to operate at a load level where temperature setpoints are reached quickly while energy consumption is reduced.

At step 702, power consumption weighting parameters, comfort weighting parameters, and temperature setpoints are obtained. In one embodiment, power consumption weighting parameters, comfort weighting parameters, and temperature setpoints and are determined by the requests aggregation circuit 608 based on user inputs. For example, a user may select a preference for maintaining temperature setpoints or decreasing power consumption, or may set power consumption and comfort weighting parameter values directly, rather than selecting a preference. In another embodiment, the power consumption weighting parameter, comfort weighting parameter, and temperature setpoints are determined based on building or system schedules. In other embodiments, the power consumption weighting parameter, comfort weighting parameter, and temperature setpoints and are received from other sources, such as a storage device (e.g., RAM, ROM, hard disk storage, server, etc.).

At step 704, a subplant curve for the equipment is obtained. For example, a subplant curve may be a known function based on the power consumption of the equipment 600, denoted herein as $Q_k=f(P_k)$, where $Q_k$ is the heating and/or cooling provided by the equipment 600, $P_k$ is the aggregated power consumption of the equipment 600, and k denotes a time step. The relationship between the generated heating and/or cooling of the equipment 600 and the power consumption of the equipment 600 may be known, as shown in FIGS. 8A-8B, which are described in detail in subsequent paragraphs. In other embodiments, the relationship between generated heating and/or cooling of the equipment 600 and the power consumption of the equipment 600 may be determined based on historical data, current readings of the sensors 612, individual component specifications of the equipment 600, a predictive model, or by additional methods.

At step 708, building loads are predicted based on historical load data, weather data, and building occupancy data, when available. In various embodiment, load predictions, denoted herein as $Qload_k$ where k denotes a time step, may be generated using on an auto-regressive model, a machine-learning algorithm, a state-space model, a combination of stochastic and deterministic models, or some other predictive modeling approach. In these various embodiments, $Qload_k$ may be generated using any combination of historical load data, weather data, and building occupancy data.

At step 710, an objective function is obtained that includes the temperature setpoints, power consumption weighting parameter, and comfort weighting parameter. In some embodiments, the objective function can be represented by:

$$J(P) = \frac{1}{2}\sum_{k=1}^{h}(q_k(T_k - Tsp_k)^2 + r_k P_k^2)$$

as described above. In such embodiments, $Tsp_k$, the average temperature setpoint, is defined as an average of the temperature setpoints received in step 702. Similarly, $q_k$ is defined as the power consumption weighting parameter and $r_k$ is defined as the comfort weighting parameter, also received in step 702. The building temperature prediction $T_k$ may be obtained during this step using a predictive thermal model, for example represented as:

$$T_k = \left(1 - \frac{1}{RC_z}\right)T_{k-1} + \frac{1}{RC_z}T_{m,k-1} - \frac{1}{C_z}Q_k + \frac{1}{C_z}Qload_k$$
$$T_{m,k} = \frac{1}{RC_m}T_{k-1} + \left(1 - \frac{1}{RC_m}\right)T_{m,k-1}$$

as described above. In such embodiments, $Qload_k$ is the predicted building load as predicted in step 708, while $Q_k$ denotes the heat or cooling provided by the equipment (i.e., the equipment 600). $Q_k$ is defined using the efficiency function $Q_k = f(P_k)$ obtained in step 704.

In other embodiments, an objective function is obtained that includes the temperature setpoints, a comfort weighting parameter, and an efficiency term. The efficiency term may be defined as the coefficient of performance of the equipment (e.g., equipment 600) or another variable that represents that efficiency of the equipment 600 at a time step k. In such embodiments, the objective function can be represented by:

$$J(P) = \frac{1}{2}\sum_{k=1}^{h}(q_k(T_k - Tsp_k)^2 - \eta_k^2)$$

where $Tsp_k$ is the average (e.g., mean, weighted average, etc.) temperature setpoint across multiple building zones at time step k, h is the optimization horizon, $q_k$ is a weighting parameter for the comfort term, and $\eta_k$ is the efficiency term. As described above, the building temperature prediction $T_k$ may be obtained during this step using a predictive thermal model.

In some embodiments, $\eta_k$ may be defined as $\eta_k = COP_k$, where $COP_k$ is the coefficient of performance of the equipment at a time step k. The coefficient of performance of the equipment may be defined as the ratio of heating and/or cooling generated by the equipment (i.e., load production) to power (i.e., resource) consumption. Generally, the coefficient of performance may be defined as:

$$COP_k = \frac{Q_k}{P_k}$$

where $Q_k$ is the amount of heating and/or cooling generated by the equipment 600 and $P_k$ is the aggregate power consumption of the equipment. It follows that the coefficient of performance of the equipment may be represented as $COP_k = f(Q_k, P_k)$.

In other embodiments, the aggregate power consumption of the equipment 600 may be affected by another variable, such as the outdoor air temperature, denoted herein as $OAT_k$. In such embodiments, $P_k$ may be defined as $P_k = f(OAT_k)$, as shown in FIG. 10A, described in detail below. It follows that the coefficient of performance may then be defined as $COP_k = f(Q_k, OAT_k)$, as shown in FIG. 10B and FIGS. 11A-11B described in detail below.

At step 712, an optimization is performed on the objective function to determine equipment power consumption values over a time horizon. To achieve this optimization, a value of the power consumption, P, is determined for each time step k over time horizon h, such that the value of J(P) of the objective functions shown above is minimized according to a number of constraints. For example, the predictive thermal model presented above (i.e., $T_k$), $Qload_k$, and/or $Q_k$ may be implemented as constraints on the optimization of J(P). These constraints may prevent a value of P from being determining that violates said constraints. Other constraints limit the value of P, such that $P \leq P_{max}$, where $P_{max}$ is the maximum power of the equipment 600. $T_k$ may be limited such that $T_{min} < T_k < T_{max}$, where, $T_{min}$ and $T_{max}$ are minimum and maximum temperature setpoints, respectively, that constrain $T_k$ such that the comfort term of the objective function will not be driven to uncomfortable levels.

At step 714, one or more pieces of equipment may be controlled based on the equipment power consumption values determined in step 712. For example, a control circuit, such as the system management circuit 502, may regulate the power consumption of each individual component of a system, such as a packaged air conditioner 504. According to the optimized objective function of step 712, the load of the packaged air conditioner 504 will be regulated by the system management circuit 502 such that the power consumption, P, of the packaged air conditioner 504 does not exceed the value of P determined during the optimization of the objective function. Additionally, the system management circuit 502 may regulate the load of the packaged air conditioner 504 such that adequate temperature error response time is achieved (i.e., keeping the load of the packaged air conditioner 504 high enough as to not exceed P but to achieve desired temperature setpoints as quickly as possible). In some embodiments, the regulation of equipment loads may be achieved using supervisory control, where a supervisory controller (in the examples here, the system management circuit 502) allocates power consumption values P to one or more controllers of the equipment 600, and the controllers then operate (e.g., execute a feedback control loop) to drive actual temperatures towards temperature setpoints while also preventing power consumption of the equipment 600 from exceeding the power consumption values P. Other implementations of supervisory control using the optimization approach described herein are also possible, and may be adapted for use with various types of the equipment 600.

Referring now to FIGS. 8A-8B, subplant curves are shown, according to some embodiments. A subplant curve may indicate a relationship between power (i.e., resource) consumption and heating and/or cooling generated by the equipment 600 (i.e., load production), as described in U.S. Pat. No. 10,175,681 issued Jan. 8, 2019, which is incorporated by reference herein, in its entirety. FIG. 8A shows a subplant curve when the equipment 600 is operating in a cooling capacity, according to one embodiment. FIG. 8B shows a subplant curve when the equipment 600 is operating in a heating capacity, according to another embodiment. FIGS. 8A-8B are shown with load normalized to a percentage of the maximum load (i.e., load=$(Q/Q_{max})\times 100\%$).

The relationship between generated heating and/or cooling capacity and power consumed (i.e., a subplant curve) may generally be defined by $Q_k = f(P_k)$, where $Q_k$ is the heating and/or cooling capacity of the equipment 600, $P_k$ is the aggregated power consumption of the equipment 600, and k denotes a time step, as described above. In some embodiments, the relationship between the generated heating and/or cooling of the equipment 600 and the power consumption for the equipment 600 is known (e.g., pre-programmed based on manufacturer specifications), as shown in FIGS. 8A-8B, or found experimentally. In other embodiments, the subplant curves may be based on historical data, current readings of the sensors 612, individual component specifications of the equipment 600, a predictive model, or by additional methods.

As shown in FIG. 8A, the subplant curve of the equipment 600 in a cooling state has a minimal or negative slope between 20% and 40% load, indicating that an the equipment 600 load maintained within this range is ideal to minimize power consumption while maintaining comfort levels (i.e., temperature setpoints). Above 40% load, the equipment 600 may achieve temperature setpoints more quickly, but power consumption increases at a much greater rate. As shown in FIG. 8B, the subplant curve of the equipment 600 in a heating state has a slightly flatter slope between 20% and 40% load. Similarly to the equipment 600 in a cooling state, at a load above 40%, the equipment 600 may achieve temperature setpoints more quickly, but power consumption increases at a greater rate. These example graphs, example percentage values, example efficiency functions, etc., represent the performance of an example set of equipment, such that particular values, slopes, etc., may vary between implementations. The function $Q_k = f(P_k)$ can be adjusted across implementations to account for these variations.

Figure 9A:
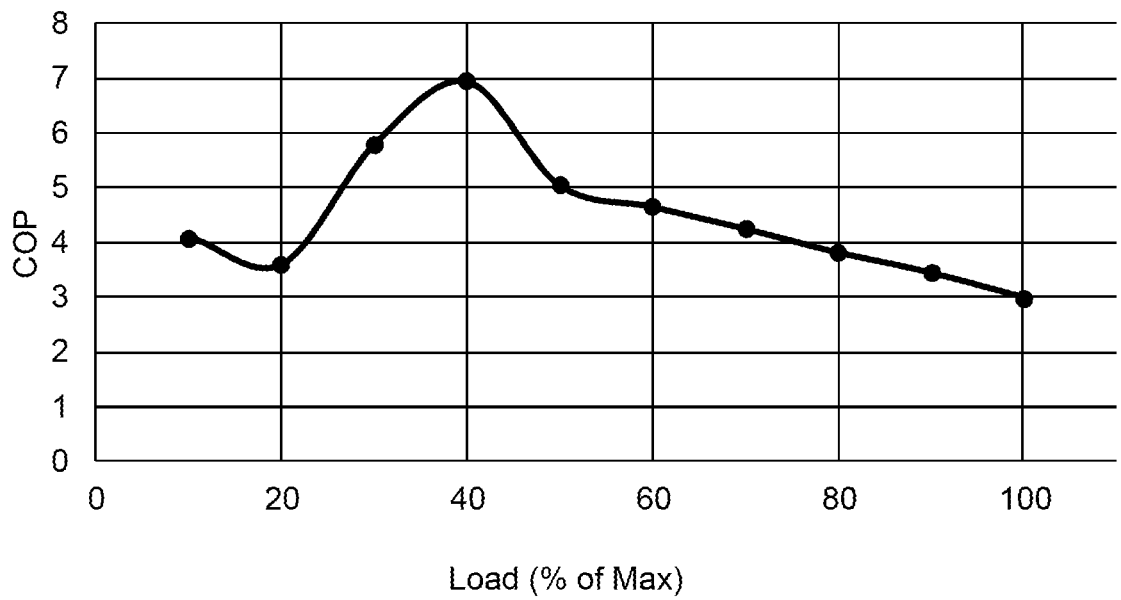
FIG. 9A is a graph of the coefficient of performance as a function of equipment load for a variable refrigerant flow system, a room air conditioner, a window air conditioner, or a packaged air conditioner system in a cooling condition, according to an exemplary embodiment.
Figure 9B:
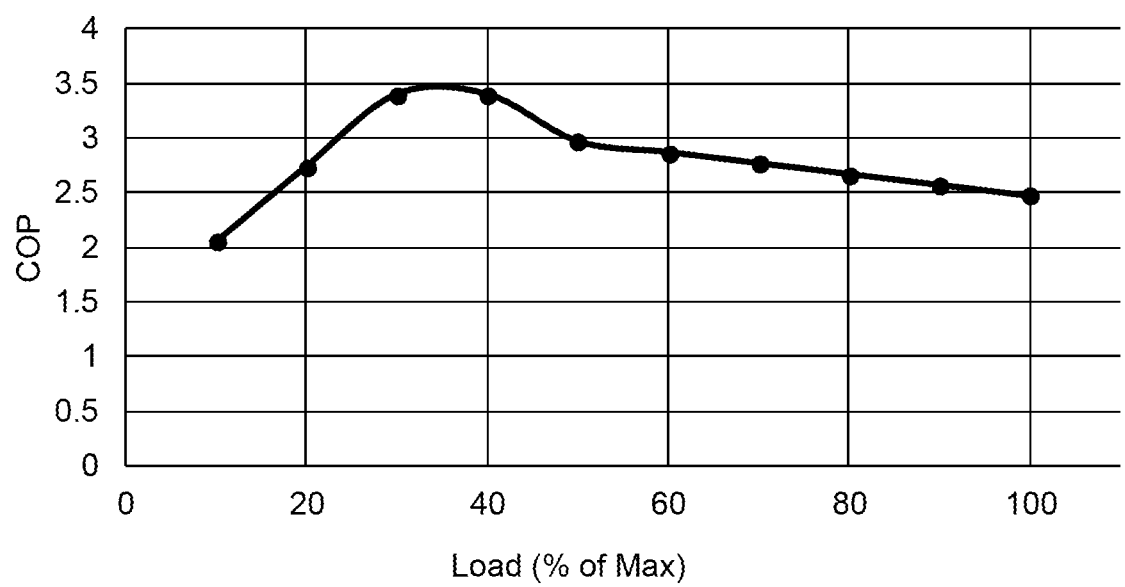
FIG. 9B is a graph of the coefficient of performance as a function of equipment load for a variable refrigerant flow system in a heating condition, according to an exemplary embodiment.

Referring now to FIGS. 9A-9B, the of the coefficient of performance as a function of equipment load is shown for subplants operating in a cooling and heating capacity, according to some embodiments. More specifically, FIG. 9A shows this relationship when the equipment 600 is operating in a cooling capacity and FIG. 9B shows this relationship when the equipment 600 is operating in a heating capacity. The coefficient of performance for a subplant (i.e., the equipment 600) may generally be defined $COP_k = Q_k/P_k$, as described above, where $Q_k$ is the amount of heating and/or cooling generated (i.e., heating and/or cooling capacity) by the equipment 600, $P_k$ is the aggregate power consumption of the equipment 600, and k denotes a time step. FIGS. 9A-9B are shown with normalized to a percentage of the maximum load (i.e., load=$(Q/Q_{max})\times 100\%$).

As shown in FIG. 9A, the coefficient of performance of the equipment 600 in a cooling capacity is highest near 40% load, indicating that the equipment 600 loads maintained at or near 40% of the maximum load may help to maximize the amount of cooling generated by the equipment 600 relative to the power consumption of the equipment 600. As shown in FIG. 9B, the coefficient of performance of the equipment 600 in a heating capacity is highest near 40% load, indicating that the equipment 600 loads maintained at or near 40% of the maximum load may help to maximize the amount of heating generated by the equipment 600 relative to the power consumption of the equipment 600. These example graphs, example percentage values, example efficiency functions, etc., represent the performance of an example set of equipment, such that particular values, slopes, etc., may vary between implementations. The functions $Q_k = f(P_k)$ and $COP_k = Q_k/P_k$ can be adjusted across implementations to account for these variations.

Referring now to FIG. 10A, the power consumption of a subplant is shown relative to the outdoor air temperature, according to some embodiments. Generally, the relationship between the power consumption of the subplant(s) and the outdoor air temperature is broadly defined by $P_k = f(OAT_k)$, as defined in previous paragraphs. FIG. 10A presents an example of such a relationship. In the example of FIG. 10A, the power consumption of the equipment 600 is shown to rise at a greater rate as the outdoor air temperature increases. For example, an outdoor unit of VRF system 100 that is cooled using outdoor air may consume less power to meet a temperature setpoint when it is cooler outside (e.g., at night) over times when it is warmer outside (e.g., mid-day), as cooler outdoor air results in greater heat transfer, thereby requiring less energy to operate the VRF system 100.

Referring now to FIG. 10B, the coefficient of performance of a subplant is shown relative to the outdoor air temperature, according to some embodiments. Generally, the relationship between the coefficient of performance of the subplants(s) and the outdoor air temperature is broadly defined as $COP_k = f(Q_k, OAT_k)$, as defined in detail in previous paragraphs. In the example of FIG. 10B, the amount of heating and/or cooling provided by the equipment, $Q_k$, is regarded as a constant for a time step k. FIG. 10B shows that the coefficient of performance of the subplant drops with increasing outdoor air temperature, for reasons similar to those discussed in the previous paragraph. The example graphs shown in FIGS. 10A-10B, example efficiency functions, etc., represent the performance of an example set of equipment, such that particular values, slopes, etc., may vary between implementations. The functions $P_k = f(OAT_k)$ and $COP_k = f(Q_k, OAT_k)$ can be adjusted across implementations to account for these variations.

Referring now to FIGS. 11A and 11B, the coefficient of performance of a subplant is shown relative to the outdoor air temperature and the equipment (e.g., equipment 600) load, according to some embodiments. As defined in previous paragraphs, the relationship between the coefficient of performance of the subplants(s), the outdoor air temperature, and load is broadly defined as $COP_k = f(Q_k, OAT_k)$. FIG. 11A shows an example of this relationship in a 3D space, from a first perspective. Generally, $COP_k = f(Q_k, OAT_k)$ can be presented as a surface, where a point on the surface corresponds to a coefficient of performance at a specific outdoor air temperature and load. For example, FIG. 11A shows the coefficient of performance as highest near a 40% load and 0° C. As the outdoor air temperature increases, the coefficient of performance is shown to decrease at each load value. FIG. 11B shows the same data as FIG. 11A from an alternate perspective. The alternate perspective shows how the coefficient of performance decreases with increasing outdoor air temperature, while the coefficient of performance remains highest at a load near 40% of maximum for each value of the outdoor air temperature. It should be understood that the graphs of FIGS. 9A-11B show data for example embodiments, and that the data points, curves, functions, etc. may differ across various equipment and various implementations.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building cooling system comprising:
one or more cooling devices operable to affect an indoor air temperature of a building;
a system management circuit configured to:
obtain an objective function comprising a power consumption term and a comfort term, wherein:
the comfort term comprises a difference between a prediction of the indoor air temperature of the building and a temperature setpoint for the building;
the prediction of the indoor air temperature is based on an efficiency model that defines a relationship between cooling capacity of the one or more cooling devices and power consumption of the one or more cooling devices; and
the power consumption term is a function of the power consumption of the one or more cooling devices;

perform an optimization of the objective function over a time horizon to determine a plurality of values of the cooling capacity of the one or more cooling devices, each value of the cooling capacity corresponding to a time step of the time horizon; and control the one or more cooling devices based on the plurality of values of the cooling capacity of the one or more cooling devices.

2. The system of claim 1, wherein the one or more cooling devices comprise at least one of variable refrigerant flow units, room air conditioning units, packaged air conditioning units, or window air conditioning units.

3. The system of claim 1, wherein the prediction of the indoor air temperature is based on a dynamic thermal model of the building comprising the efficiency model, wherein the relationship defined by the efficiency model is at least a three-dimensional relationship between the cooling capacity of the one or more cooling devices, the power consumption of the one or more cooling devices, and an outdoor air temperature.

4. The system of claim 1, wherein the objective function further comprises a sum of the power consumption term and the comfort term.

5. The system of claim 1, wherein the objective function further comprises a weighting parameter multiplied by the power consumption term or the comfort term.

6. The system of claim 5, wherein the system management circuit is configured to obtain the weighting parameter from a user input.

7. The system of claim 1, wherein controlling the one or more cooling devices based on the plurality of values of the cooling capacity of the one or more cooling devices comprises preventing, for each time step of the plurality of time steps, the cooling capacity of the one or more cooling devices from exceeding the value of the cooling capacity for the corresponding time step.

8. A method comprising:
operating equipment to affect an indoor air temperature of a building;
obtaining an objective function comprising a power consumption term and a comfort term, wherein:
the comfort term comprises a difference between a prediction of the indoor air temperature of the building and a temperature setpoint for the building;
the prediction of the indoor air temperature is based on an efficiency model that defines at least one of heating capacity or cooling capacity of the equipment as a function of power consumption of the equipment; and
the power consumption term is a function of the power consumption of the equipment;
determining, for each of a plurality of time steps of a time horizon, a value of at least one of the heating capacity or the cooling capacity of the equipment by performing an optimization of the objective function over the time horizon; and
controlling, for each of the plurality of time steps of the time horizon, the equipment based on the value of at least one of the heating capacity or the cooling capacity of the equipment.

9. The method of claim 8, wherein the prediction of the indoor air temperature is based on a dynamic thermal model of the building comprising the efficiency model.

10. The method of claim 8, wherein the objective function comprises a sum of the power consumption term and the comfort term.

11. The method of claim 8, wherein controlling the equipment based on the value of at least one of the heating capacity or the cooling capacity of the equipment comprises preventing, for each of the plurality of time steps, at least one of the heating capacity or the cooling capacity of the equipment from exceeding the value for the corresponding time step.

12. The method of claim 8, further comprising multiplying the comfort term or the power consumption term by a weighting parameter.

13. The method of claim 12, further comprising obtaining a value of the weighting parameter based on a user input.

14. A building cooling system comprising:
one or more cooling devices operable to affect an indoor air temperature of a building;
a system management circuit configured to:
obtain an objective function comprising an efficiency term and a comfort term, wherein:
the comfort term comprises a difference between a prediction of the indoor air temperature of the building and a temperature setpoint for the building;
the prediction of the indoor air temperature is based on an efficiency model that defines a relationship between cooling capacity of the one or more cooling devices and power consumption of the one or more cooling devices; and
the efficiency term is a function of the power consumption of the one or more cooling devices;
perform an optimization of the objective function over a time horizon to determine a plurality of values of the cooling capacity of the one or more cooling devices, each value of the cooling capacity corresponding to a time step of the time horizon; and
control the one or more cooling devices based on the plurality of values of the cooling capacity of the one or more cooling devices.

15. The system of claim 14, wherein the one or more cooling devices comprise at least one of variable refrigerant flow units, room air conditioning units, packaged air conditioning units, or window air conditioning units.

16. The system of claim 14, wherein the prediction of the indoor air temperature is based on a dynamic thermal model of the building comprising the efficiency model.

17. The system of claim 14, wherein the objective function further comprises a difference of the efficiency term and the comfort term.

18. The system of claim 14, wherein the objective function further comprises a weighting parameter multiplied by the comfort term.

19. The system of claim 18, wherein the system management circuit is configured to obtain the weighting parameter from a user input.

20. The system of claim 14, wherein controlling the one or more cooling devices based on the plurality of values of the cooling capacity of the one or more cooling devices comprises preventing, for each time step of the plurality of time steps, the cooling capacity of the one or more cooling devices from exceeding the value of the cooling capacity for the corresponding time step.

* * * * *